US012318736B2

(12) United States Patent
Deng et al.

(10) Patent No.: US 12,318,736 B2
(45) Date of Patent: Jun. 3, 2025

(54) GAS SEPARATION MEMBRANES

(71) Applicant: NORWEGIAN UNIVERSITY OF SCIENCE AND TECHNOLOGY (NTNU), Trondheim (NO)

(72) Inventors: Liyuan Deng, Trondheim (NO); Saravanan Janakiram, Trondheim (NO); Luca Ansaloni, Trondheim (NO)

(73) Assignee: NORWEGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 170 days.

(21) Appl. No.: 17/780,217

(22) PCT Filed: Apr. 30, 2021

(86) PCT No.: PCT/EP2021/061478
§ 371 (c)(1),
(2) Date: May 26, 2022

(87) PCT Pub. No.: WO2021/219887
PCT Pub. Date: Nov. 4, 2021

(65) Prior Publication Data
US 2023/0016870 A1  Jan. 19, 2023

(30) Foreign Application Priority Data

Apr. 30, 2020 (GB) .................................... 2006427

(51) Int. Cl.
*B01D 69/14* (2006.01)
*B01D 53/22* (2006.01)
(Continued)

(52) U.S. Cl.
CPC ......... *B01D 69/148* (2013.01); *B01D 53/228* (2013.01); *B01D 67/0079* (2013.01);
(Continued)

(58) Field of Classification Search
None
See application file for complete search history.

(56) References Cited

U.S. PATENT DOCUMENTS

2015/0096935 A1* 4/2015 Mitra ................... B01D 69/148
210/500.33
2015/0231556 A1* 8/2015 Ahn .................... B01D 67/0079
427/244
(Continued)

FOREIGN PATENT DOCUMENTS

CN  107469635  12/2019
EP  3626334    3/2020
(Continued)

OTHER PUBLICATIONS

International Search report and Written Opinion issued for Application No. PCT/EP2021/061478, dated Jul. 8, 2021.
(Continued)

*Primary Examiner* — Jason M Greene
(74) *Attorney, Agent, or Firm* — Thomas | Horstemeyer, LLP

(57) ABSTRACT

A composite membrane suitable for separating a gas from a gas mixture comprising a selective layer coated on a support, wherein said selective layer comprises: a) a polymeric matrix comprising an amine polymer; b) a graphene oxide nanofiller; and c) a mobile carrier selected from an ionic liquid or an amino acid salt.

20 Claims, 13 Drawing Sheets

(51) Int. Cl.
| | |
|---|---|
| B01D 67/00 | (2006.01) |
| B01D 69/02 | (2006.01) |
| B01D 69/06 | (2006.01) |
| B01D 69/08 | (2006.01) |
| B01D 69/10 | (2006.01) |
| B01D 69/12 | (2006.01) |
| B01D 71/02 | (2006.01) |
| B01D 71/26 | (2006.01) |
| B01D 71/60 | (2006.01) |
| C10L 3/10 | (2006.01) |

(52) U.S. Cl.
CPC ............. *B01D 69/02* (2013.01); *B01D 69/06* (2013.01); *B01D 69/08* (2013.01); *B01D 69/105* (2013.01); *B01D 69/12* (2013.01); *B01D 71/0211* (2022.08); *B01D 71/262* (2022.08); *B01D 71/601* (2022.08); *B01D 2323/21* (2013.01); *B01D 2323/226* (2022.08); *B01D 2325/04* (2013.01); *C10L 3/104* (2013.01); *C10L 2290/548* (2013.01)

(56) References Cited

U.S. PATENT DOCUMENTS

| | | | |
|---|---|---|---|
| 2016/0354729 | A1 | 12/2016 | Krishna et al. |
| 2018/0147513 | A1* | 5/2018 | Ho ................. B01D 69/148 |
| 2021/0394127 | A1* | 12/2021 | Ho ................. B01D 69/148 |

FOREIGN PATENT DOCUMENTS

| | | | |
|---|---|---|---|
| WO | 2020011892 | | 1/2020 |
| WO | 2020056414 | | 3/2020 |
| WO | 2020087067 | | 4/2020 |
| WO | 2020232398 | A1 | 11/2020 |
| WO | 2020240522 | | 12/2020 |
| WO | 2021041581 | | 3/2021 |

OTHER PUBLICATIONS

Search Report issued for Application No. GB2006427.5, dated Oct. 27, 2020, 5 pages.

NAMS-GO final was in Lexington Hilton, Annual Meeting, Jun. 9-13, 2018. Poster.

RAM-2D materials SJR NAMS 2019-Lily presented in Pittsburgh NAMS 2019, May 11-15, 2019. Poster.

M. Bui, et al., , Carbon capture and storage (CCS): The way forward, Energy Environ. Sci. 11 (2018) 1062-1176. doi: 10.1039/c7ee02342a.

I.E.A. (IEA), Energy and Climate Change : World Energy Outlook Special Report, 2015. Https://www.iea.org/publications/freepublications/publication/WEO2015SpecialReportonEnergyandClimateChange.pdf.

M.Z. Jacobson, Review of solutions to global warming, air pollution, and energy security, Energy Environ. Sci. 2 (2008) 148-173. doi:10.1039/B809990C.

H. Lin, B.D. Freeman, Materials selection guidelines for membranes that remove CO2 from gas mixtures, J. Mol. Struct. 739 (2005) 57-74. doi: 10.1016/j.molstruc.2004.07.045.

R.D. Noble, Perspectives on mixed matrix membranes, J. Memb. Sci. 378 (2011) 393-397. doi:10.1016/j.memsci.2011.05.031.

B.D. Freeman, Basis of Permeability/Selectivity Tradeoff Relations in Polymeric Gas Separation Membranes, Macromolecules. 32 (1999) 375-380. doi:10.1021/ma9814548.

Y. Han, W.S.W. Ho, Recent advances in polymeric membranes for CO2 capture, Chinese J. Chem. Eng. 26 (2018) 2238-2254. doi:10.1016/j.cjche.2018.07.010.

L.M. Robeson, The upper bound revisited, J. Memb. Sci. 320 (2008) 390-400. doi:10.1016/j.memsci.2008.04.030.

H.B. Park, J. Kamcev, L.M. Robeson, M. Elimelech, B.D. Freeman, Maximizing the right stuff: The trade-off between membrane permeability and selectivity, Science (80-. ). 356 (2017) eaab0530. doi:10.1126/science.aab0530.

S. Janakiram, M. Ahmadi, Z. Dai, L. Ansaloni, L. Deng, Performance of nanocomposite membranes containing 0D to 2D nanofillers for CO2 separation: A review, Membranes (Basel). 8 (2018). doi:10.3390/membranes8020024.

M. Ahmadi, S. Janakiram, Z. Dai, L. Ansaloni, L. Deng, Performance of mixed matrix membranes containing porous two-dimensional (2D) and three-dimensional (3D) fillers for CO2separation: A review, Membranes (Basel). 8 (2018) 50. doi: 10.3390/membranes8030050.

L. Ansaloni, L. Deng, Advances in polymer-inorganic hybrids as membrane materials, Elsevier Ltd, 2016. doi:10.1016/B978-0-08-100408-1.00007-8.

S. Janakiram, X. Yu, L. Ansaloni, Z. Dai, L. Deng, Manipulation of Fibril Surfaces in Nanocellulose-Based Facilitated Transport Membranes for Enhanced CO2 Capture, ACS Appl. Mater. Interfaces. 11 (2019) 33302-33313. doi:10.1021/acsami.9b09920.

L. Deng, M.B. Hägg, Carbon nanotube reinforced PVAm/PVA blend FSC nanocomposite membrane for CO2/CH4 separation, Int. J. Greenh. Gas Control. 26 (2014) 127-134. doi:10.1016/j.ijggc.2014.04.018.

L. Ansaloni, Y. Zhao, B.T. Jung, K. Ramasubramanian, M.G. Baschetti, W.S.W. Ho, Facilitated transport membranes containing amino-functionalized multi-walled carbon nanotubes for high-pressure CO$_2$ separations, J. Memb. Sci. 490 (2015) 18-28. doi: 10.1016/j.memsci.2015.03.097.

Z.P. Smith, B.D. Freeman, Graphene Oxide: A New Platform for High-Performance Gas- and Liquid-Separation Membranes, Angew. Chemie Int. Ed. 53 (2014) 10286-10288. doi: 10.1002/anie.201404407.

J. Shen, M. Zhang, G. Liu, K. Guan, W. Jin, Size effects of graphene oxide on mixed matrix membranes for CO $_2$ separation, AIChE J. 62 (2016) 2843-2852. doi:10.1002/aic.15260.

H.W. Kim, H.W. Yoon, S.-M. Yoon, B.M. Yoo, B.K. Ahn, Y.H. Cho, H.J. Shin, H. Yang, U. Paik, S. Kwon, J.-Y. Choi, H.B. Park, Selective Gas Transport Through Few-Layered Graphene and Graphene Oxide Membranes, Science (80-. ). 342 (2013) 91-95. doi: 10.1126/science.1236098.

Y. Zhao, W.S.W. Ho, CO 2 Selective Membranes Containing Sterically Hindered Amines for CO 2 / H 2 Separation, 3 (2013). doi:10.1021/ie301397m.

D.A. Dikin, S. Stankovich, E.J. Zimney, R.D. Piner, G.H.B. Dommett, G. Evmenenko, S.T. Nguyen, R.S. Ruoff, Preparation and characterization of graphene oxide paper, Nature. (2007). doi:10.1038/nature06016.

H. Lee, S.C. Park, U.S. Roh, G.H. Moon, J.E. Shin, Y.S. Kang, H.B. Park, Metal-Organic Frameworks Grown on Porous Planar Template with Exceptionally High Surface Area: Promising Nanofiller Platforms for CO2 Separation, J. Mater. Chem. A. 5 (2017) 22500-22505. doi:10.1039/C7TA06049A.

Z. Liu, J.T. Robinson, X. Sun, H. Dai, PEGylated nanographene oxide for delivery of water-insoluble cancer drugs, J. Am. Chem. Soc. 130 (2008) 10876-10877. doi:10.1021/ja803688x.

Z. Dai, S. Fabio, N. Giuseppe Marino, C. Riccardo, L. Deng, Field test of a pre-pilot scale hollow fiber facilitated transport membrane for CO 2 capture, Int. J. Greenh. Gas Control. 86 (2019) 191-200. doi:10.1016/j.ijggc.2019.04.027.

S. Park, K.S. Lee, G. Bozoklu, W. Cai, S.B.T. Nguyen, R.S. Ruoff, Graphene oxide papers modified by divalent ions—Enhancing mechanical properties via chemical cross-linking, ACS Nano. 2 (2008) 572-578. doi:10.1021/nn700349a.

K. Krishnamoorthy, M. Veerapandian, K. Yun, S.J. Kim, The chemical and structural analysis of graphene oxide with different degrees of oxidation, Carbon N. Y. 53 (2013) 38-49. doi:10.1016/j.carbon.2012.10.013.

Y. Wang, Y. Shao, D.W. Matson, J. Li, Y. Lin, Nitrogen-doped graphene and its application in electrochemical biosensing, ACS Nano. 4 (2010) 1790-1798. doi:10.1021/nn100315s.

J. Liu, H. Yang, S.G. Zhen, C.K. Poh, A. Chaurasia, J. Luo, X. Wu, E.K.L. Yeow, N.G. Sahoo, J. Lin, Z. Shen, A green approach to the

(56) References Cited

OTHER PUBLICATIONS synthesis of high-quality graphene oxide flakes via electrochemical exfoliation of pencil core, RSC Adv. 3 (2013) 11745-11750. doi:10.1039/c3ra41366g.
V. Palermo, I.A. Kinloch, S. Ligi, N.M. Pugno, Nanoscale Mechanics of Graphene and Graphene Oxide in Composites: A Scientific and Technological Perspective, Adv. Mater. 28 (2016) 6232-6238. doi:10.1002/adma.201505469.
S. Rapino, E. Treossi, V. Palermo, M. Marcaccio, F. Paolucci, F. Zerbetto, Playing peekaboo with graphene oxide: A scanning electrochemical microscopy investigation, Chem. Commun. 50 (2014) 13117-13120. doi: 10.1039/c4cc06368f.
L. Chen, Z. Xu, J. Li, B. Zhou, M. Shan, Y. Li, L. Liu, B. Li, J. Niu, Modifying graphite oxide nanostructures in various media by high-energy irradiation, RSC Adv. 4 (2014) 1025-1031. doi:10.1039/c3ra46203j.
H. Zhang, D. Hines, D.L. Akins, Synthesis of a nanocomposite composed of reduced graphene oxide and gold nanoparticles, Dalt. Trans. 43 (2014) 2670-2675. doi: 10.1039/c3dt52573b.
H. Bai, W. Jiang, G.P. Kotchey, W.A. Saidi, B.J. Bythell, J.M. Jarvis, A.G. Marshall, R.A.S. Robinson, A. Star, Insight into the mechanism of graphene oxide degradation via the photo-fenton reaction, J. Phys. Chem. C. 118 (2014) 10519-10529. doi:10.1021/jp503413s.
A. Lak, J. Dieckhoff, F. Ludwig, J.M. Scholtyssek, O. Goldmann, H. Lünsdorf, D. Eberbeck, A. Kornowski, M. Kraken, F.J. Litterst, K. Fiege, P. Mischnick, M. Schilling, Highly stable monodisperse PEGylated iron oxide nanoparticle aqueous suspensions: A nontoxic tracer for homogeneous magnetic bioassays, Nanoscale. 5 (2013) 11447-11455. doi:10.1039/c3nr02197a.
K. Erickson, R. Erni, Z. Lee, N. Alem, W. Gannett, A. Zettl, Determination of the local chemical structure of graphene oxide and reduced graphene oxide, Adv. Mater. 2 (2010) 4467-4472. doi: 10.1002/adma.201000732.
A. Liscio, K. Kouroupis-Agalou, X.D. Betriu, A. Kovtun, E. Treossi, N.M. Pugno, G. De Luca, L. Giorgini, V. Palermo, Evolution of the size and shape of 2D nanosheets during ultrasonic fragmentation, 2D Mater. 4 (2017) 025017. doi:10.1088/2053-1583/aa57ff.
Z.Y. Xia, S. Pezzini, E. Treossi, G. Giambastiani, F. Corticelli, V. Morandi, A. Zanelli, V. Bellani, V. Palermo, The exfoliation of graphene in liquids by electrochemical, chemical, and sonication-assisted techniques: A nanoscale study, Adv. Funct. Mater. 23 (2013) 4684-4693. doi:10.1002/adfm.201203686.
U. Khan, A. O'Neill, M. Lotya, S. De, J.N. Coleman, High-concentration solvent exfoliation of graphene, Small. 6 (2010) 864-871. doi:10.1002/smll.200902066.
B.D. Ossonon, D. Bélanger, Synthesis and characterization of sulfophenyl-functionalized reduced graphene oxide sheets, RSC Adv. 7 (2017) 27224-27234. doi: 10.1039/c6ra28311j.
N. Sharma, V. Sharma, Y. Jain, M. Kumari, R. Gupta, S.K. Sharma, K. Sachdev, Synthesis and Characterization of Graphene Oxide (GO) and Reduced Graphene Oxide (rGO) for Gas Sensing Application, Macromol. Symp. 372 (2017) 1700006. doi: 10.1002/masy.201700006.
F. Tuinstra, J.L. Koenig, Raman Spectrum of Graphite, J. Chem. Phys. 53 (1970). doi:10.1063/1.1674108.
L.M. Malard, M.A. Pimenta, G. Dresselhaus, M.S. Dresselhaus, Raman spectroscopy in graphene, Phys. Rep. 473 (2009) 51-87. doi:10.1016/j.physrep.2009.02.003.
R.J. Nemanich, S.A. Solin, First- and second-order Raman scattering from finite- size crystals of graphite, Phys. Rev. B. 20 (1979) 392. doi:10.1103/PhysRevB.20.392.
A.C. Ferrari, J. Robertson, Origin of the 1150-cm-1 Raman mode in nanocrystalline diamond, Phys. Rev. B—Condens. Matter Mater. Phys. 63 (2001) 1-4. doi:10.1103/PhysRevB.63.121405.
X. Díez-Betriu, S. Álvarez-García, C. Botas, P. Álvarez, J. Sánchez-Marcos, C. Prieto, R. Menéndez, A. De Andrés, Raman spectroscopy for the study of reduction mechanisms and optimization of conductivity in graphene oxide thin films, J. Mater. Chem. C. 1 (2013) 6905-6912. doi:10.1039/c3tc31124d.
A.A.K. King, B.R. Davies, N. Noorbehesht, P. Newman, T.L. Church, A.T. Harris, J.M. Razal, A.I. Minett, A new raman metric for the characterisation of graphene oxide and its derivatives, Sci. Rep. 6 (2016). doi: 10.1038/srep19491.
Y. Zhang, Q. Shen, J. Hou, P.D. Sutrisna, V. Chen, Shear-aligned graphene oxide laminate/Pebax ultrathin composite hollow fiber membranes using a facile dip-coating approach, J. Mater. Chem. A. 5 (2017) 7732-7737. doi:10.1039/c6ta10395b.
S.J. Lue, Y.L. Pai, C.M. Shih, M.C. Wu, S.M. Lai, Novel bilayer well-aligned Nafion/graphene oxide composite membranes prepared using spin coating method for direct liquid fuel cells, J. Memb. Sci. 493 (2015) 212-223. doi:10.1016/j.memsci.2015.07.007.
Y. Li, Z. Yang, H. Qiu, Y. Dai, Q. Zheng, J. Li, J. Yang, Self-aligned graphene as anticorrosive barrier in waterborne polyurethane composite coatings, J. Mater. Chem. A. 2 (2014) 14139-14145. doi:10.1039/c4ta02262a.
L. Deng, T.J. Kim, M.B. Hägg, Facilitated transport of $CO_2$ in novel PVAm/PVA blend membrane, J. Memb. Sci. 340 (2009) 154-163. doi:10.1016/j.memsci.2009.05.019.
J. Huang, J. Zou, W.S.W. Ho, Carbon Dioxide Capture Using a $CO_2$-Selective Facilitated Transport Membrane, Ind. Eng. Chem. Res. 47 (2008) 1261-1267. doi:10.1021/ie070794r.
D. Peng, S. Wang, Z. Tian, X. Wu, Y. Wu, H. Wu, Q. Xin, J. Chen, X. Cao, Z. Jiang, Facilitated transport membranes by incorporating graphene nanosheets with high zinc ion loading for enhanced $CO_2$ separation, J. Memb. Sci. 522 (2017) 351-362. doi:10.1016/j.memsci.2016.09.040.
O.C. Compton, S. Kim, C. Pierre, J.M. Torkelson, S.T. Nguyen, Crumpled Graphene Nanosheets as Highly Effective Barrier Property Enhancers, Adv. Mater. 22 (2010) 4759-4763. doi:10.1002/adma.201000960.
R.K. Joshi, S. Alwarappan, M. Yoshimura, V. Sahajwalla, Y. Nishina, Graphene oxide: The new membrane material, Appl. Mater. Today. 1 (2015) 1-12. doi:10.1016/j.apmt.2015.06.002.
Q. Xin, Y. Gao, X. Wu, C. Li, T. Liu, Y. Shi, Y. Li, Z. Jiang, H. Wu, X. Cao, Incorporating one-dimensional aminated titania nanotubes into sulfonated poly(ether ether ketone) membrane to construct $CO_2$-facilitated transport pathways for enhanced $CO_2$ separation, J. Memb. Sci. 488 (2015) 13-29. doi:10.1016/j.memsci.2015.02.047. .
S. Zhao, Z. Wang, Z. Qiao, X. Wei, C. Zhang, J. Wang, S. Wang, Gas separation membrane with $CO_2$-facilitated transport highway constructed from amino carrier containing nanorods and macromolecules, J. Mater. Chem. A. 1 (2013) 246-249. doi:10.1039/C2TA00247G.
T.S. Chung, L.Y. Jiang, Y. Li, S. Kulprathipanja, Mixed matrix membranes (MMMs) comprising organic polymers with dispersed inorganic fillers for gas separation, Prog. Polym. Sci. 32 (2007) 483-507. doi:10.1016/j.progpolymsci.2007.01.008.
X. Li, Y. Cheng, H. Zhang, S. Wang, Z. Jiang, R. Guo, H. Wu, Efficient $CO_2$ capture by functionalized graphene oxide nanosheets as fillers to fabricate multi-permselective mixed matrix membranes, ACS Appl. Mater. Interfaces. 7 (2015) 5528-5537. doi:10.1021/acsami.5b00106.
L. Deng, M.B. Hägg, Techno-economic evaluation of biogas upgrading process using $CO_2$ facilitated transport membrane, Int. J. Greenh. Gas Control. 4 (2010) 638-646. doi:10.1016/j.ijggc.2009.12.013.
Q. Sun, H. Li, J. Yan, L. Liu, Z. Yu, X. Yu, Selection of appropriate biogas upgrading technology—a review of biogas cleaning, upgrading and utilisation, Renew. Sustain. Energy Rev. 51 (2015) 521-532. doi:10.1016/j.rser.2015.06.029.
R. He, S. Cong, J. Wang, J. Liu, Y. Zhang, Porous Graphene Oxide/Porous Organic Polymer Hybrid Nanosheets Functionalized Mixed Matrix Membrane for Efficient $CO_2$ Capture, ACS Appl. Mater. Interfaces. 11 (2019) 4338-4344. doi:10.1021/acsami.8b17599.
G. Dong, J. Hou, J. Wang, Y. Zhang, V. Chen, J. Liu, Enhanced $CO_2/N_2$ separation by porous reduced graphene oxide/Pebax mixed matrix membranes, J. Memb. Sci. 520 (2016) 860-868. doi:10.1016/j.memsci.2016.08.059.

(56) References Cited

OTHER PUBLICATIONS

G. Dong, Y. Zhang, J. Hou, J. Shen, V. Chen, Graphene Oxide Nanosheets Based Novel Facilitated Transport Membranes for Efficient CO2 Capture, Ind. Eng. Chem. Res. 55 (2016) 5403-5414. doi:10.1021/acs.iecr.6b01005.

Y. Shen, H. Wang, J. Liu, Y. Zhang, Enhanced Performance of a Novel Polyvinyl Amine/Chitosan/Graphene Oxide Mixed Matrix Membrane for CO2 Capture, ACS Sustain. Chem. Eng. 3 (2015) 1819-1829. doi:10.1021/acssuschemeng.5b00409.

R. Casadei, D. Venturi, M.G. Baschetti, L. Giorgini, E. Maccaferri, S. Ligi, Polyvinylamine membranes containing graphene-based nanofillers for carbon capture applications, Membranes (Basel). 9 (2019) 119. doi:10.3390/membranes9090119.

Q. Xin, Z. Li, C. Li, S. Wang, Z. Jiang, H. Wu, Y. Zhang, J. Yang, X. Cao, Enhancing the CO 2 separation performance of composite membranes by the incorporation of amino acid-functionalized graphene oxide, J. Mater. Chem. A. 3 (2015) 6629-6641. doi:10.1039/C5TA00506J.

L.S. White, X. Wei, S. Pande, T. Wu, T.C. Merkel, Extended flue gas trials with a membrane-based pilot plant at a one-ton-per-day carbon capture rate, J. Memb. Sci. 496 (2015) 48-57. doi:10.1016/j.memsci.2015.08.003.

G. Huang et al., "Pebax/ionic liquid modified graphene oxide mixed matrix membranes for enhanced CO2 capture" Journal of Membrane Science, 2018, 565, 370-379.

\* cited by examiner

GAS SEPARATION MEMBRANES

CROSS-REFERENCE TO RELATED APPLICATIONS

This application is a United States National Phase Patent Application filed under 35 U.S.C. § 371 of International Patent Application Number PCT/EP2021/061478, filed on Apr. 30, 2021, which claims the benefit of priority to GB Patent Application No.2006427.5, filed Apr. 30, 2020.

SUMMARY OF THE INVENTION

This invention relates to a composite membrane for separating gases from gas mixtures, preferably carbon dioxide from gas mixtures containing the same, to a process for the production of the composite membrane, to a process for separating a gas from a gas mixture, and to the use of the composite membrane to separate gases. In particular, the invention provides a composite membrane comprising a selective layer with a polymeric matrix, a graphene oxide nanofiller and a mobile carrier.

BACKGROUND TO THE INVENTION

The global climate crisis post industrialisation is primarily due to post industrialisation and anthropogenic factors. Of all the causes, the tremendous increase in greenhouse gas emissions, most importantly, the emission of $CO_2$, over the past few decades, could be directly coupled to the current global warming scenario. Implementation of Carbon Capture, Utilization and Sequestration (CCUS) represents the most effective solution for the coming decade to undergo the transition to a more sustainable energy system. However, limitations relating to the cost and technical viability in the $CO_2$ capture technologies (i.e., absorption, membrane separation and adsorption) still pose as the main challenges to be addressed in the implementation of CCUS.

Polymeric gas separation membranes have been explored widely for $CO_2$ separation applications due to their low-cost, high modularity and easy scalability. Membrane materials with preeminent permeation properties (permeability and selectivity), as well as good chemical and mechanical properties, increase efficiency of separation processes significantly. Conventional polymeric membranes based on the solution-diffusion mechanism suffer due to the inherent trade-off between permeability and selectivity, as denoted by the Robeson upper bound.

An approach to overcome this trade-off is by use of nanofillers in polymeric selective layers to form hybrid membranes containing nanofillers. Nevertheless, limited studies have been reported fabricating hollow fiber thin composite membranes with hybrid selective layer for $CO_2$ separation applications. Many of these solutions use thick membranes with nanofillers.

While there exists a variety of nanofillers that enhance $CO_2$ permeation properties in conventional polymeric membrane, 2D nanofillers like graphene oxide (GO) are seldom studied for membrane fabrication. Their high surface-to-volume ratio arising from the 2D structure triggers nanoscopic property changes when dispersed in polymeric matrices. Effective dispersion of these platelets, even under small quantities, affects reorienting of the polymer chain packing, inducing changes in crystallinity, fractional free volume and $CO_2$ solubility. Wang et al, in Journal of Membrane Science 589 (2019) 117246 describe polyaniline-coated carbon nanotubes in between graphene oxide (GO) layers in PVAm membrane.

Another approach to overcome the permeability-selectivity "trade-off" is by use of $CO_2$-reactive carriers in the polymeric selective layer. These facilitated transport membranes transfer $CO_2$ through an additional reactive pathway than conventional polymers that follow solution-diffusion mechanism.

The reactive carriers are typically amine groups fixed to the backbone of the polymeric chain. Recently, small $CO_2$-philic molecules that reversibly react with $CO_2$ are also added to the polymeric host matrices as "mobile carriers" to increase $CO_2$ transport. These reactions require water to aid $CO_2$ transport across the membrane. In J. Memb. Sci. 2019, Vol 578, 61-68, Dai et al. describe the additional of amino acid salts to a PVA membrane.

The present invention concerns separation membranes comprising a selective layer coated on a support. In particular, the present invention involves the incorporation of 2 dimensional (2D) nanofillers in the selective layer, in particular graphene oxide nanofillers. Due to their large aspect ratio, 2D materials such as graphene oxide (GO) significantly influence mechanical and transport properties when added as nanofillers in composite membranes. The presence of hydroxyl groups on the GO surface also brings in hydrophilicity and increased surface interaction with $CO_2$. Conveniently, GO nanosheets being hydrophilic when added to facilitated transport matrices, induce the polymer chain disruption leading to distributed water channels with increased $CO_2$ solubility. These effects on the gas separation properties of such hybrid membranes highly rely on the surface chemistry of the added nanosheets and their lateral dimensions.

We have found that GO-based 2D nanoplatelets in composite membranes for $CO_2$ separation offer a valuable class of membranes, Hybrid Facilitated Transport Membranes (HFTMs), in the form of thin-film composites (TFCs) having superior permeation properties even with ultrathin selective layers. Previously, 2D nanoplatelets were considered to have a negative impact on gas separation when dispersed in polymer matrices due to their barrier property, and the fabrication of TFC membranes with ultrathin selective layers (<500 nm) comprising of 2D nanoplatelets in facilitated transport membranes was deemed challenging.

The inventors have surprisingly found that the use of mobile carriers, i.e. low molecular weight $CO_2$-philic components, in the selective layer further increases the performance and helps especially with $CO_2/CH_4$ separations to resist the carrier saturation phenomena. In particular, the mobile carriers act synergistically with a modified graphene oxide in combination with an amine polymer matrix to improve permeance and selectivity. The presence of mobile carriers also reduces carrier saturation.

Size controlled 2D graphene oxide also positively influences $CO_2$ transport, even at very low loading.

A surprising aspect of the present invention is that the composite membranes comprising the mobile carriers and GO-based fillers have, at industrially relevant conditions, increased $CO_2$ permeance and increased $CO_2$ flux compared to the same modules without the mobile carriers.

SUMMARY OF INVENTION

Viewed from one aspect the invention provides a composite membrane suitable for separating a gas from a gas mixture comprising a selective layer coated on a support, wherein said selective layer comprises:
- a) a polymeric matrix comprising an amine polymer;
- b) a graphene oxide nanofiller; and
- c) a mobile carrier selected from an ionic liquid or an amino acid salt.

In a further aspect the invention relates to a composite membrane suitable for separating a gas from a gas mixture comprising a selective layer coated on a hollow fiber support, wherein said selective layer comprises:
- a) a polymeric matrix comprising an amine polymer;
- b) a porous graphene oxide or PEG-modified graphene oxide nanofiller, and optionally
- c) a mobile carrier selected from an ionic liquid or an amino acid salt.

In a further aspect the invention relates to a composite membrane suitable for separating a gas from a gas mixture comprising a selective layer coated on a flat sheet support, wherein said selective layer comprises:
- a) a polymeric matrix comprising an amine polymer;
- b) a porous graphene oxide or PEG-modified graphene oxide nanofiller, and optionally
- c) a mobile carrier selected from an ionic liquid or an amino acid salt.

In a further aspect, the invention relates to a composite membrane suitable for separating a gas from a gas mixture comprising a selective layer coated on a support, e.g. a hollow fiber or flat sheet support, wherein said selective layer comprises:
a) a polymeric matrix comprising an amine polymer;
b) a porous graphene oxide nanofiller or chemically-modified graphene oxide nanofiller, optionally wherein the chemically-modified graphene oxide nanofiller is graphene oxide with an organic unit grafted thereon, preferably wherein said organic unit is selected from a nitrogen and/or oxygen-containing organic unit, a polymer, or a nitrogen- and/or oxygen-containing polymer, preferably said chemically-modified graphene oxide nanofiller is PEG-modified graphene oxide nanofiller, and optionally
c) a mobile carrier selected from an ionic liquid or an amino acid salt.

Viewed from another aspect the invention provides process for the formation of a composite membrane comprising the steps of:
- (I) forming an aqueous solution comprising:
  - a) a polymeric matrix comprising an amine polymer;
  - b) a graphene oxide nanofiller; and optionally
  - c) a mobile carrier selected from an ionic liquid or an amino acid salt;
- (II) casting said aqueous solution onto a support, e.g. flat sheet or hollow fiber support.

In particular, said process comprises the steps of:
- (I) forming an aqueous solution comprising:
  - a) a polymeric matrix comprising an amine polymer;
  - b) a graphene oxide nanofiller; and
  - c) a mobile carrier selected from an ionic liquid or an amino acid salt;
- (II) casting said aqueous solution onto a flat sheet support using a bar roller to apply the selective layer.

Viewed from another aspect the invention provides a process for the formation of a composite membrane comprising the steps of:
- (I) forming an aqueous solution comprising:
  - a) a polymeric matrix comprising an amine polymer;
  - b) a graphene oxide nanofiller, and
  - c) a mobile carrier selected from an ionic liquid or an amino acid salt;
- (II) casting said aqueous solution onto a support using a dip coating method to fabricate a selective layer, preferably where the support is a hollow fiber support;

The invention also provides a process for separating a gas from a gas mixture, for example a process for separating carbon dioxide from a gas mixture comprising carbon dioxide comprising passing said gas mixture through a composite membrane as herein before defined. In one embodiment the composite membrane comprises a hollow fiber support and a plurality of such composite membranes are present within a module.

The invention also provides the use of a composite membrane as hereinbefore defined in the separation of a gas from a gas mixture, for example the separation of carbon dioxide from a gas mixture comprising carbon dioxide.

The features of the aspects and/or embodiments indicated herein are usable individually and in combination in all aspects and embodiments of the invention where technically viable, unless otherwise indicated.

Definitions

The following definitions apply:

The term composite membrane implies the presence of a support and a selective layer thereon. The selective layer itself may also be referred to as the membrane. The composite membrane facilitates gas separation, such carbon dioxide separation from a gas mixture.

DETAILED DESCRIPTION OF THE INVENTION

The present invention relates to a composite membrane for gas separation. The composite membrane is suitable for separating a gas from a gas mixture and comprises, in one embodiment, a selective layer coated on a support, wherein said selective layer comprises:
- a) a polymeric matrix comprising an amine polymer;
- b) a graphene oxide nanofiller, and
- c) a mobile carrier selected from an ionic liquid or an amino acid salt.

Support

Gas separating membranes can typically take two forms, supported or unsupported. The present membranes are carried on a support. As noted below, the support can be in the form of a flat sheet or a hollow fiber support. Both these support types are covered in this invention.

Suitable supports are known in the art and most are ones which are porous to the gas being transported. Typically, the support is porous, therefore. Suitable supports include polyethersulfone (PES), polytetrafluoroethylene (PTFE), polypropylene, sulphonated polysulfone, polyvinylidene fluoride (PVDF), polyacrylonitrile (PAN) and related block copolymers, cellulosics such as cellulose acetate (CA), polyimide, polyether imide (PEI), aliphatic polyamides, polyetheretherketone (PEEK), polyphenylene oxide (PPO) and polysulfone (PSf). Such supports are available commercially from suppliers such as Osmonics. In a preferred embodiment the support is PVDF, especially where the support is in the form of a flat sheet. Where the support is a hollow fiber both PSf and especially PPO are preferred, in particular PPO.

Most of these supports are typically ultrafiltration supports where the size of the pores in the support is of the order of 20 to 1000 Angstroms although it is more common to express pore sizes in terms of molecular weight cut off values.

In some embodiments of the invention, it is also within the scope of the invention to employ microporous support structures. Such supports have much bigger pores sizes, e.g. 0.10 to 10 µm making gas transport there through very rapid. It is not normal to express pore sizes of these supports in MWCO terms but in this invention, microporous supports are considered to have MWCO values of greater than 100,000.

Microporous supports can be formed from any suitable material including those mentioned above in connection with ultrafiltration supports and inorganic materials such as ceramics (alumina, zirconium oxide), glass membranes such as silica and so on. These can be prepared by sintering, sol gel or leaching techniques known in the art.

Conventionally, it has been assumed that the use of these microporous supports in gas separation membranes using selective layer polymers was not possible as the pores of the support are so large that the polymer would simply collapse into the pores. This can be overcome by utilising high molecular weight polymers in the selective layer, which have been found not only to possess excellent permeance and selectivity but also excellent mechanical strength. Alternatively, a pore filler such as 3M™ Fluorinert™ Electronic Liquid FC-72 can be used to fill the pores to avoid pore penetration of the casting solution. This is a low viscosity, low VOC fluorinated compound. The use of a fluorinated hydrocarbon is preferred as a pore filler. The mechanical strength of high Mw polymers allows them to be used without the problem of filling in even when the pores in the support material are micron sized.

The molecular weight cut off (MWCO) of the support is preferably kept as high as possible. MWCO is essentially a measure of the pore size in a support with larger MWCO values representing higher pore sizes. The MWCO in this invention is preferably more than 20,000, e.g. at least 35,000, preferably more than 50,000, more preferably at least 60,000, especially at least 75,000. In a highly preferred embodiment the MWCO is at least 100,000. In fact, the invention enables the use of supports having MWCO of up to 300,000, e.g. 30,000 to 300,000. In one embodiment, the MWCO may be less than the molecular weight Mw of the polymer from the selective layer cast on top.

It has been found that when a composite membrane of the invention was prepared using a selective layer of high molecular weight, the problem of "filling in" is minimised even if using a high molecular weight support. This then allows the use of a high MWCO support and can therefore lead to an improvement in permeance and selectivity.

Without wishing to be limited by theory, when using porous supports with larger pores, whether ultrafiltration or microfiltration supports, the increased pore size not only decreases the mass transfer resistance towards a gas to be separated but also changes the support separation mechanism itself. An ultrafiltration support with low pore size (low MWCO) may present selectivity towards nitrogen, for example, via Knudsen diffusion and not towards carbon dioxide.

As noted in more detail below, using a high Mw selective layer polymer allows the use of porous support with larger pores and consequently low mass transfer resistance towards the gas molecules separated by the selective layer without affecting mechanical stability.

In a preferred embodiment the support can have a porous lower layer with a thin dense top layer. By dense is meant that there are no pores in the dense top layer.

The dense top layer is preferably no more than 60 nm in thickness, e.g. around 40 nm or less in thickness. It is however within the scope of the invention for the dense layer to have a greater thickness e.g. 100 to 1000 nm, such as 200 to 700 nm, e.g. 600 nm.

Supports with dense top layers are preferably hollow fiber supports and ideally can be formed from PPO. The dense top layer is formed during the spinning process. In this case, a pore filler is not required.

Polymeric Matrix

The selective layer comprises an amine polymer. The polymeric matrix can comprise one or more polymers. By 'polymeric matrix' is meant the polymer component a) in the selective layer of the composite membrane. The polymeric matrix comprises an amine-based polymer, e.g. a polymer with a hydrocarbon backbone with pendant amine groups or a polyamine (i.e. with amine groups in the backbone). Preferably, the polymeric matrix comprises a polymer with a hydrocarbon backbone with pendant amine groups. More preferably, this is a polyallylamine-based or polyvinylamine-based polymer. Polyallylamine-based or polyvinylamine-based polymers cover polyallyamines ('PAA's) or polyvinalamines ('PVAm's) which have been modified, e.g. structurally modified at the amino group. Polyallylamine-based polymers are particular preferred.

In a particular embodiment, the polymeric matrix comprises a sterically hindered polymer of the following formula (I):

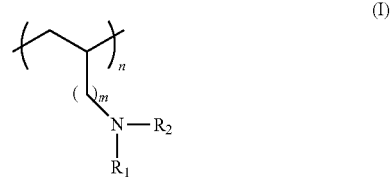

wherein $R_1$ and $R_2$ are independently selected from hydrogen or a $C_1$-$C_{10}$ hydrocabyl group, preferably $C_1$-$C_6$ hydrocarbyl group, preferably $C_1$-$C_6$ alkyl, such as methyl, ethyl, n-propyl, isopropyl, n-butyl, sec-butyl, isobutyl or tert-butyl, more preferably isopropyl or sec-butyl. Preferably one of R1 and R2 is hydrogen and the other is a $C_1$-$C_{10}$ hydrocabyl group, preferably $C_1$-$C_6$ hydrocarbyl group, preferably $C_1$-$C_6$ alkyl, such as methyl, ethyl, n-propyl, isopropyl, n-butyl, sec-butyl, isobutyl or tert-butyl, more preferably isopropyl or sec-butyl.

The integer m is typically 0-6, preferably 0-2, more preferably 0-1, most preferably 1.

The integer n is used to denote the polymeric nature of the structure, and the value of n is typically such that the polymeric matrix has a Mw as defined below or in the claims. This definition of n is valid for the definitions of the structures below.

Steric hindrance of amine-based polymers in solid phase has been demonstrated to increase gas permeation performance of facilitated transport membranes.

In a particular embodiment, the polymeric matrix comprises a sterically hindered polyallylamine ('SHPAA') of formula (II):

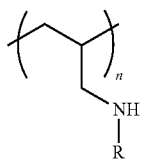

(II)

wherein R is a $C_1$-$C_{10}$ hydrocabyl group, preferably $C_1$-$C_6$ hydrocarbyl group, preferably $C_1$-$C_6$ alkyl, such as methyl, ethyl, n-propyl, isopropyl, n-butyl, sec-butyl, isobutyl or tert-butyl, more preferably R is isopropyl or sec-butyl. In a particular embodiment, therefore, SHPAA is selected from:

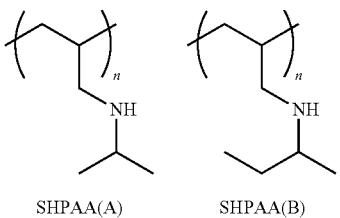

SHPAA(A)   SHPAA(B)

Typically, SHPAA(A) is used with a flat sheet support and SHPAA(B) is used with a hollow fiber support. In a particular embodiment, SHPAA(B) is preferred.

Similarly, the selective layer polymer can be a sterically hindered polyvinylamine polymer (SHPVAm) of formula (III):

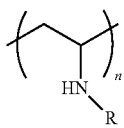

(III)

SHPVAm wherein R is defined as above for sterically hindered polyallylamine (SHPAA).

The polymeric matrix can comprise a single polymer or a combination of two or more polymers. In a particular embodiment, the polymeric matrix consists of at least one polymer. Typically, the polymer matrix comprises at least 60 wt %, preferably at least 70 wt %, more preferably at least 80 wt %, more preferably at least 85 wt % of the amine based-polymer as defined herein or in the claims. Typically, the polymer matrix comprises 60-99 wt %, preferably 70-98 wt %, 80-95 wt % of the amine-based polymer. In some embodiments, the amine polymer is the only polymer in the polymer matrix.

Typically, the polymeric matrix makes up at least 50 wt % of the selective layer, e.g. at least 60 wt %, at least 70 wt %, at least 80 wt %, at least 90 wt %, or at least 95 wt % of the selective layer. Typically, the polymeric matrix makes up 50-99 wt % of the selective layer, preferably 60-95 wt %, more preferably 70-95 wt % of the selective layer.

In a particular embodiment, the amine-based polymer (e.g. SHPAA) can be combined with another polymer, in a particular an oxygen-containing polymer, e.g. polyvinylalcohol (PVA). The oxygen containing polymer can comprise oxygen based functional groups in the backbone of the polymer or as pendant functional groups. The oxygen group is preferably hydroxyl. The oxygen group is preferably pendant. The use of PVA is preferred.

The combination of the amine-based polymer with a second polymer, in particular PVA, results in a reduction of the brittleness of the selective layer, and superior transport properties due to the water-swelling nature of the PVA.

Viewed from another aspect the invention provides a composite membrane suitable for separating a gas from a gas mixture comprising a selective layer coated on a support, wherein said selective layer comprises:
a) a polymeric matrix comprising an amine polymer and PVA;
b) a graphene oxide nanofiller; and
c) a mobile carrier selected from an ionic liquid or an amino acid salt.

This advantage is most prominent when the second polymer, e.g. PVA, is present in an amount of 2-20 wt %, preferably 5-15 wt % based on the combined weights of the amine-based polymer and second polymer. This ensures low brittleness without compromising the separation properties of the selective layer.

The weight average molecular weight (Mw) of the polymeric matrix used in this invention can range from 10,000 to 3,000,000, preferably 20,000 to 750,000 more preferably 30,000 to 500,000, more preferably 80,000 to 300,000 (molecular weights are herein given in g/mol unless indicated otherwise).

The weight average molecular weight (Mw) of the selective layer polymer is typically at least 50,000. Preferably, the Mw of the selective layer polymer is at least 100,000.

The weight average molecular weight (Mw) of the amine polymer is typically at least 50,000. Preferably, the Mw of the selective layer polymer is at least 100,000, such as 80,000 to 300,000.

The weight average molecular weight (Mw) of the oxygen polymer such as PVA is typically at least 50,000. Preferably, the Mw of the selective layer polymer is at least 100,000, such as 80,000 to 300,000.

It has been found that using higher Mw gives the selective layer strength. This allows the use of a support with a much higher MWCO. In a particular embodiment, the invention therefore provides a selective layer polymer having a Mw of at least 100,000 with a support having a MWCO of at least 60,000.

It has also been observed that even when using a higher molecular weight polymer, this does not result in a reduction in permeance or selectivity. The use of a higher Mw polymer means that the actual selective layer used will tend to be denser than selective layers formed from lower Mw polymers. Surprisingly, the inventors have found that even at higher densities the permeance values of the composite membranes remain very high and the gas selectivity is good.

A further benefit of the use of a higher Mw polymer matrix concerns water uptake. The higher Mw polymer has more densely packed molecular chains meaning more densely packed amino groups. This leads to greater water uptake in comparison to lower Mw polymers which promotes reactivity of the amino groups to, inter alia, carbon dioxide.

The skilled person might also expect that increased water uptake would lead to selective layer swelling and hence lower permeance values as thicker selective layers are obviously harder for gases to cross. However, any swelling which does occur is limited and counter balanced by the increase in carbon dioxide transfer which the higher uptake of water facilitates.

The combination therefore of a higher molecular weight polymeric matrix with high MWCO supports provides composite membranes with excellent properties.

A further benefit of the use of higher Mw polymer matrix is their ability to withstand greater pressures. The membranes of the prior art are conventionally used at low gas pressures. Flue gases from industrial plants can however be at relatively high pressures, e.g. up to 15 bars and ideally any composite membrane would be able to carry out gas separation on such higher pressure gases. In particular, it is preferred that the permeance and selectivities obtained at higher gas pressures are not reduced (or not significantly reduced) relative to operation at lower pressures. It is a further feature of this invention that the composite membranes claimed are able to handle gases which are under pressure, e.g. at a pressure of up to 20 bars, e.g. up to 15 bars, such as 2 to 15 bars or 2 to 10 bars.

Cross-linking the high Mw polymers actually leads to a reduction in permeance and selectivity as it causes densification of the selective layer making it harder for the carbon dioxide to come into contact with the amine groups in the polymer. For a lower molecular weight polymer however, cross-linking is typically essential to provide a selective layer with sufficient strength that it will not "fill in" the pores in the support.

When using a higher Mw polymer matrix, the requirement to cross-link using a cross-linking agent is no longer present as the higher Mw provides the selective layer with sufficient strength that the filling in problem is overcome. Also, despite the use of a higher Mw polymeric matrix causing an overall densification of selective layer relative to a lower polymeric matrix, no reduction of permeance or selectivity caused by the use of a higher Mw polymeric matrix is observed. In fact the opposite observation is made and the membranes actually perform better than cross-linked counterparts. It is especially preferred therefore if the selective layer is not cross-linked using an external cross-linking agent.

Thermal treatment of the composite membrane may provide advantageous properties, especially where the composite membrane will operate at elevated gas pressures, e.g. above 10 bars.

By thermal treatment is meant exposing the composite membrane (i.e. membrane on the support) to heat to induce strength therein. Suitable thermal treatment conditions encompass heating to 50 to 150° C., e.g. 80 to 120° C., especially 90 to 110° C. This thermal treatment step is not regarded as being a cross-linking step as no external cross-linking agent is employed however it does impart additional strength to the composite membrane, perhaps by encouraging intermolecular interaction between polymer chains and between the polymeric matrix and the porous support.

It will be clear that thermal treatment of the selective layer takes place when this is supported. Without wishing to be limited by theory, it is believed that the thermal treatment step also modifies the support thus allowing improved permeance values. It may be that the interaction between the support and the dense layer of amine polymer is improved.

Graphene Oxide Nanofiller

The selective layer of the composite membrane of the invention also comprises a graphene oxide nanofiller, in particular 2D graphene oxide filler. The term 2D implies that one of the dimensions of the filler is very small, e.g. 10 nm or less. The graphene oxide fillers are therefore in the form of flakes or can be considered planar with width and height but very low thickness. Graphene oxide (GO) is therefore a two-dimensional material and thus the terms nanofiller, nanoplatelets, or nanosheets, can be used interchangeably herein. The term graphene oxide also covers graphene oxide that has been modified, either physically or chemically.

The membrane of the invention is typically a 'hybrid' membrane. The graphene oxide nanofiller is therefore typically dispersed within the polymeric matrix comprising an amine polymer.

The terms 'nanofiller', 'nanoplatelets', or 'nanosheets' indicate that the average dimension of the graphene oxide is of 1000 nm or less, e.g. is in the range 10-1000nm, preferably 100-1000 nm, more preferably 300-900 nm, more preferably 400-800 nm. These dimensions refer to the average lateral dimensions, i.e. in the 2D plane of the nanosheets. These dimensions can be measured using Atomic Force microscopy (AFM).

It has surprisingly been found that the size of the GO flakes influence the gas permeation performance, and the best results have been observed for average dimensions in the range 400-800 nm. Average particle sizes of more than 1000 nm (i.e. 'micro' fillers) lead to a decrease in performance. The average thickness of the graphene oxide nanosheets is typically 10 nm or less, such as 2.0 nm or less, especially 1.0 nm or less. In a particular embodiment, the nanosheets are at least one layer of graphene oxide thick, e.g. at least two layers thick. In a particular embodiment, the graphene oxide nanofiller is in the form of graphene oxide monolayers.

In a particular embodiment, the nanofiller is size-controlled, i.e. the particles are uniform or substantially uniform in their size distribution. The size distribution profile is typically unimodal. Typically, at least 75%, preferably at least 90%, more preferably at least 95%, more preferably at least 99% of the nanofiller particles are within ±50%, preferably within ±25%, more preferably within ±10% of the average dimension. Alternatively, at least 75%, preferably at least 90%, more preferably at least 95%, more preferably at least 99% of the nanofiller particles can have (average) lateral dimensions of less than 1000 nm. Alternatively, at least 75%, preferably at least 90%, more preferably at least 95%, more preferably at least 99% of the nanofiller particles can have (average) lateral dimensions in the range 10-1000 nm. Alternatively, at least 75%, preferably at least 90%, more preferably at least 95%, more preferably at least 99% of the nanofiller particles can have (average) lateral dimensions in the range 100-1000 nm. Alternatively, at least 75%, preferably at least 90%, more preferably at least 95%, more preferably at least 99% of the nanofiller particles can have (average) lateral dimensions in the range 300-900 nm. Alternatively, at least 75%, preferably at least 90%, more preferably at least 95%, more preferably at least 99% of the nanofiller particles can have (average) lateral dimensions in the range 400-800 nm.

Different suppliers of GO provide dispersions of different flake size. The size of the flakes is typically optimized to get the best performance. The present inventors used GO from commercial supplier Graphene-XT for certain hollow fiber composite membranes and prepared their own nanofillers for flat sheet composite membranes. The nanofiller from either source can be exfoliated by means of sonication to obtain monolayers of GO. Different sonication times can be used to control the flake size and effect the gas permeation performance. The use of sonication to control flake size is potentially valuable. Longer sonication leads to smaller flakes. Sonication for 4 to 8 hrs appears to lead to ideal GO flake sizes.

Graphene oxide can furthermore be engineered to improve the gas permeation in a composite membrane. Both physically and chemically modified GO nanoplatelets with an array of properties can be synthesized and successfully dispersed in polymer matrices. These physically and chemically modified GO nanoplatelets can also be subject to sonication to control flake size a priori.

In a particular embodiment, the graphene oxide nanofiller has been physically modified, e.g. using hydrogen peroxide, to render it porous. Such modification may occur at high temperature, e.g. 100 to 250° C. Thus, in a particular embodiment, the graphene oxide is porous. Typically, the average size of the pores is 1-200 nm, such as 2 to 20 nm.

The physical modification to render the GO porous is expected to create defects in the plane perpendicular to the direction of gas transport while preserving the 2D morphology of the original platelet. More generally, increased pore content and defects across the thickness generated during the treatment process trigger nanoscopic changes in polymer packing resulting in enhanced permeation.

GO nanofillers of the invention can be subject to both sonication to control particle size and physical modification to impart pores in the nanofiller.

In another embodiment, the graphene oxide is chemically modified such that it has an organic unit grafted thereon (preferably an oxygen- and/or nitrogen-containing organic unit), preferably a polymer, preferably a nitrogen- and/or oxygen-containing organic polymer, more preferably an oxygen-containing organic polymer, e.g. a polyether, e.g. a polyalkylene polyol such as polyethylene glycol (PEG) grafted thereon. In a particular embodiment, therefore, the graphene oxide is modified with polyalkylene glycol groups such as PPG (polypropylene glycol) and/or PEG (polyethylene glycol) groups. The nitrogen-containing polymer could be, for example, a polyamine polymer, e.g. polyethylenimine (PEI). The polyether could comprise, for example, a polyether backbone (e.g. based on a polyglycerol such as hexaglycerol), with pendant PEG groups. Where the term polyalkylene polyol is used, a mixture of polyalkylene polyols (e.g. PPG and PEG) could be used. An example of an oxygen- and nitrogen-containing polymer is a PEG/PEI hybrid.

The oxygen and/or nitrogen introduce polarity to the grafted polymer which can be beneficial for membrane performance. In a particular embodiment, the oxygen is in the repeating unit (e.g. ether) and/or terminal (e.g. —OH), typically in the repeating unit. In a particular embodiment, the nitrogen is in the repeating unit (e.g. amine) and/or terminal (e.g. terminal amine groups such as —NH$_2$), typically terminal.

In a particular embodiment, the graphene oxide nanofiller is a polymer-modified graphene oxide nanofiller. Preferably, the polymer that is grafted onto the graphene oxide nanofiller is a polymer selected from or comprising a polyamine and/or a polyether, preferably a polymer selected from or comprising a polyethylenimine and/or a polyalkylene glycol, preferably a polymer selected from or comprising PEI, PPG and/or PEG, preferably a polymer selected from or comprising PPG and/or PEG, preferably a polymer which comprises PEG.

The organic units or polymers that are grafted on the graphene oxide nanofiller can be branched or linear. In the case of branched nitrogen-containing polymers, e.g. branched polyethylenimine, the polymer can have primary, secondary or tertiary amine groups, as is well known in the art.

Other groups (e.g. terminal groups such as terminal —NH$_2$ groups) may be present in the polymer unit grafted to the graphene oxide nanofiller. For example, if a PEG-containing polymer is grafted to the graphene oxide, it is within the scope of the invention for this PEG unit to contain other groups, e.g. terminal —NH$_2$ groups, or a hexaglycerol core, as in the following 8-arm PEG:

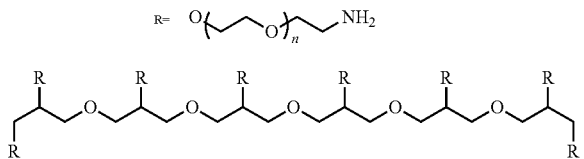

(n is such that the Mn is as defined in the ranges below).

The organic groups (e.g. PEG) can be grafted onto the graphene oxide via any typical coupling reaction, e.g. EDC coupling reaction. There can therefore be linker groups between the graphene oxide and the organic moiety. Typically, the molecular weight of the grafted groups (e.g. the nitrogen and/or oxygen-containing polymer) is in the range 1,000-500,000, preferably 1,000-100,000, preferably 2,000 to 50,000, preferably 5,000 to 20,000 g/mol. The molecular weight for the grafted group is typically given as the number average molecular weight, $M_n$. A suitable example is commercially-available 8-arm PEG, with an $M_n$ of 10,000.

GO nanofillers of the invention can be subject to both sonication to control particle size and chemical modification.

In a particular embodiment, the graphene oxide nanofiller is either porous (i.e. physically modified) or has PEG groups grafted thereon (i.e. chemically modified).

The amount of graphene oxide nanofiller in the selective layer is typically less than 5 wt %, preferably less than 1 wt %, more preferably less than 0.5 wt %. Suitable ranges include 0.05 wt % to 5.0 wt %, preferably 0.1 to 1.0 wt %, preferably 0.1 to 0.5 wt % or preferably 0.1 to 0.3 wt %. These wt % are determined on a dry weight basis.

The inventors surprisingly found that at very low loadings (e.g. down to 0.2 wt % nanofiller), graphene oxide could efficiently increase the $CO_2$ permeance by about 200% compared to that of the non-modified selective layer with no significant changes in selectivity. At low loadings, graphene oxide (whether graphene oxide, porous graphene oxide or chemically-modified graphene oxide) effectively disrupts polymer chain packing while simultaneously increasing $CO_2$ sorption and reorienting water distribution in the matrix.

In a particular embodiment, the nanofillers are aligned or substantially aligned in the selective layer, i.e. the planes formed by the 2D shape of the nanofiller particles are parallel or substantially parallel, and preferably parallel or substantially parallel to the plane formed by the selective layer. In other words, the nanofiller particles are typically aligned or parallel along their larger two dimensions. Alternatively put, the nanofillers can be coplanar or substantially coplanar, e.g. coplanar or substantially coplanar with the plane formed by the selective layer. 'Substantially' aligned, parallel or coplanar herein typically means that 75% or more, preferably 90% or more, e.g. 95% or more of the nanofiller particles deviate from the plane formed by the selective layer by ±45° or less, preferably ±25° or less, more preferably ±10° or less. In-plane alignment of GO is attributed to the lowering of surface free energies of GO-based fillers, and leads to enhanced gas permeation. Moreover, it can often be a necessity to have the nanofillers in alignment for selective layers that are in the range of a few hundred nanometers, since the lateral dimensions can exceed the thickness of the selective layer otherwise.

In the case of porous graphene oxide, the nanofiller particles typically have evenly distributed pores. Typically, the pores in each nanofiller particle are distributed evenly throughout each layer of graphene oxide. In a particular embodiment, therefore, each layer of graphene oxide in the nanofiller particles is porous, preferably each layer of graphene oxide has a similar number of pores (e.g. within ±50%, e.g within ±25% or within ±10% of the average number of pores per layer of the particle). In a particular embodiment, the number of pores per 100 nm² deviates by at most ±50%, e.g at most ±25%, e.g. at most ±10%. The even distribution of pores can be achieved by generating the porous nanoparticles in a dispersion state (e.g. hydroxide treatment on already cleaved monolayers in GO dispersion). The creation of pores in the dispersion state ensures that pores are created in all monolayers of graphene oxide nanofiller. If the porous graphene oxide is generated in the solid state (e.g. thermal annealing of aggregated GO powder), then the porosity is not typically uniform. Typically, therefore, the porosity in the graphene oxide is generated in a dispersion. In a particular embodiment, the pores in the graphene oxide are not prepared by solid-state treatment of the graphene oxide (e.g. thermal annealing of solid GO).

Mobile Carriers

In order to increase the number of reactive sites for the $CO_2$ to interact in the selective layer, low molecular weight $C_2$-philic components can be added. These are referred to as mobile carriers herein as they diffuse through the polymer matrix and enhance permeation. The use of mobile carriers in the selective layer increases the performance and helps especially with $CO_2/CH_4$ separations to resist the carrier saturation phenomena. The mobile carriers are typically dispersed in the polymeric matrix comprising an amine polymer.

A surprising aspect of the present invention is that the composite membranes comprising the mobile carriers have increased $CO_2$ permeance and increased $CO_2$ flux compared to the same modules without the mobile carriers, at industrially relevant conditions.

In use, the amine groups of the polymeric matrix reversibly react with $CO_2$ in the presence of water to transport $CO_2$ across the composite membrane. Although polymers like polyvinylamine and polyallylamine contain high density of amine groups relative to the hydrocarbon content in the repeating unit of the polymer, their effect to contribute to increased $CO_2$ transport relies on the access to the amine groups for $CO_2$ and the proximity to form continuous channels for $CO_2$ reaction and transfer. The amine groups in the polymer matrix are however locked in the polymer, restricting their mobility.

To increase diffusivity, mobile carriers which are also $CO_2$-philic are added in the matrix. The addition of these mobile carriers not only enhances the density of $CO_2$-philic moieties in the polymer matrix but also increases the mobility of $C_2$-reacted species, thus increasing $CO_2$ diffusivity in the host matrix. Important characteristics of such mobile carriers include (1) low molecular weight (higher mobility), (2) high $CO_2$ uptake capacity, and (3) capability of formation of weak bond with $CO_2$ that enhances the transport of $CO_2$ through water-swollen composite membrane matrices (reversible $CO_2$ association/dissociation) and facilitate its release at the permeate side.

The mobile carrier is an ionic liquid or an amino acid salt.

An ionic liquid is salt which is a liquid at 25° C. and atmospheric pressure. Room-temperature ionic liquids comprise bulky and asymmetric organic cations often based on heterocycles such as 1-alkyl-3-methylimidazolium, 1-alkylpyridinium, fluorosulfonyl-trifluoromethanesulfonylimide (FTFSI) N-methyl-N-alkylpyrrolidinium and ammonium ions. Phosphonium cations are also possible. A wider range of anions are employed, ranging from simple halides to inorganic anions such as tetrafluoroborate and hexafluorophosphate, and to small or large organic anions like bistriflimide, acetate, cyanamide, triflate or tosylate.

Suitable ionic liquids include [Emin][OAc], [Emim][Cl], [Emim][dicyanamide], and 1-butyl-3,5-dimethylpyridinium bromide. In a particular embodiment, the ionic liquid comprises the cation 1-Ethyl-3-methylimidazolium ([Emim]) or 1-butyl-3-methylimidazolium. 1-Ethyl-3-methylimidazolium acetate ([Emim][OAc]) is particularly preferred. Typically, the ionic liquid has a melting point in the range 25 to 100° C.

Amino acid salts are salts of compounds comprising a COOH group and a amino group which may be primary, secondary or tertiary. The salt preferably forms with the acid part, i.e. the salt is a cation and the amino acid forms the anion.

Suitable amino acid salts are salts of any naturally occurring amino acid, e.g. any essential amino acid, preferably Gly, Arg, Cys or Pro. Preferred amino acid salts are salts of proline (e.g. ʟ-proline), such as a potassium salt of proline (i.e. 'ProK'). The cation in the salt is ideally an alkali metal.

[Emim][OAc], a room-temperature ionic liquid, reacts with $CO_2$ via carbene route and forms a carbene-$CO_2$ adduct. One of the main advantages of using [Emim][OAc] as mobile carrier is that its carbene-routed interaction with $CO_2$ does not influence the viscosity of the solution, which may be beneficial in reducing the mass transfer resistance in the selective layer upon the sorption of $CO_2$.

The carbene-$CO_2$ adduct (as shown in Scheme A below) has also been reported to have faster diffusion.

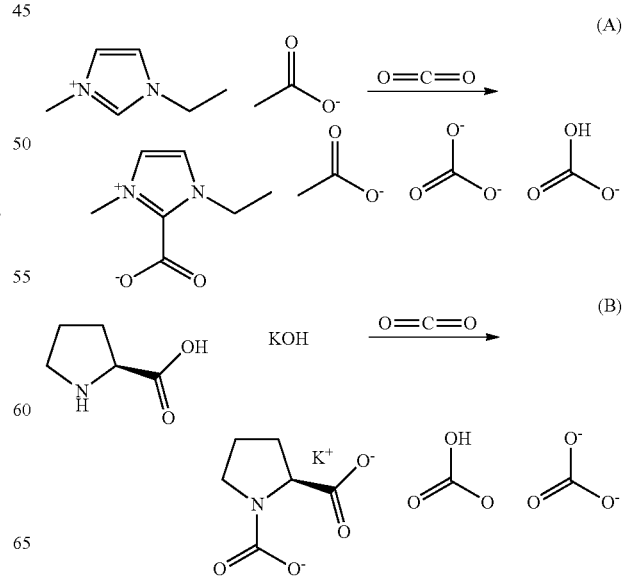

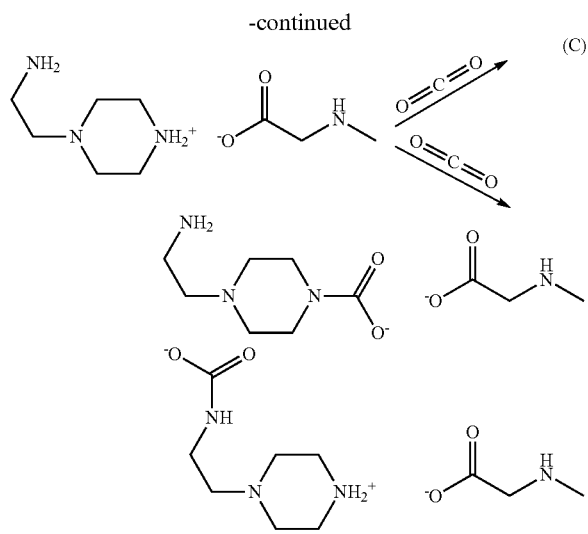

ProK (potassium L-prolinate), a secondary amino acid, reacts with $CO_2$ to form carbamate and bicarbonate/carbonate species represented in Scheme B above).

PZEA-Sarc is an amino acid salt containing one primary amine, two secondary amines (one from sarcosine) and one tertiary amine. $CO_2$ interacts with this mobile carrier to form primary and secondary mono-carbamates (Scheme C above).

The mobile carrier is typically present in the selective layer in an amount of 1.0-40 wt %, preferably 2.0-30 wt %, more preferably 5.0-25 wt % (dry weight). Particularly suitable ranges for ionic liquids include 2.0-40 wt %, preferably 5.0-15 wt %, and particularly suitable ranges for amino acid salts include 5.0-40 wt %, preferably 15-25 wt %.

Viewed from another aspect the invention provides a composite membrane suitable for separating a gas from a gas mixture comprising a selective layer coated on a support, wherein said selective layer comprises:
 a) at least 50 wt % of a polymeric matrix comprising an amine polymer;
 b) 0.05 to 5.0 wt % of a graphene oxide nanofiller; and
 c) 1.0 to 40 wt % of a mobile carrier selected from an ionic liquid or an amino acid salt.

In one embodiment, the invention relates to a composite membrane suitable for separating a gas from a gas mixture comprising a selective layer coated on a hollow fiber or flat sheet support, wherein said selective layer comprises:
 a) a polymeric matrix comprising an amine polymer and preferably PVA;
 b) a porous graphene oxide or PEG-modified nanofiller, and optionally
 c) a mobile carrier selected from an ionic liquid or an amino acid salt.

All preferred embodiments discussed above also apply to this embodiment.

Other Selective Layer Components

It is preferred if the selective layer of the invention consists essentially of the polymeric matrix, the graphene oxide nanofiller, and the mobile carrier. Typically, therefore, these materials are the only materials used in the selective layer other than minor levels of any necessary additives such as stabilisers, anti-oxidants or residuals solvents etc. The combination of the polymeric matrix, the graphene oxide nanofiller, and the mobile carrier preferably form at least 95 wt % of the selective layer, such as at least 98 wt %, especially at least 99 wt % of the selective layer. It is preferred if the selective layers of the invention consist of the polymeric matrix, the graphene oxide nanofiller, and the mobile carrier.

Support Formation

The support can be in the form of a flat sheet or hollow fiber. Techniques for making these supports are known in the art.

The hollow fiber process will normally involve dissolving the support material in a suitable solvent to form a solution and then spinning the solution to form hollow fibers. In the spinning process, the support solution is fed by the force of a pump to a spinneret and subsequently extruded. A bore liquid is passed through the centre of the spinneret to ensure that the fibers which form are hollow. The fibers pass out of the base of the spinneret and eventually into a coagulation bath. There is however, an air gap between the base of the spinneret and the coagulation bath. The presence of an air gap allows solvent evaporation and also allows the fibers to stretch and straighten under their own weight. This hollow fiber spinning technology is well known to the skilled person.

It will be appreciated that where there is a hollow fiber the selective layer can be formed on the outside or inside of the friber (although preferably not both). External coating can be performed simply using spraying or dip coating in a solution comprising the elements for the selective layer. Internal coating of hollow fibers involves circulating the solution inside the hollow fiber lumen, followed by drying as in the case of outside dip coating. The procedure is repeated until a thin defect free layer of selective layer polymer is formed. Coating internally is preferred.

In a preferred embodiment the support can have a porous lower layer with a thin dense top layer. Supports with dense top layers are preferably hollow fiber supports and ideally can be formed from PPO or PSf. The dense top layer is formed during the spinning process.

Composite Membrane Formation

The first stage in the formation of the composite membrane of the invention involves casting a solution comprising the polymeric matrix, the graphene oxide nanofiller, and the mobile carrier onto the support. The support can typically be in the form of a flat sheet or bundle of hollow fibers. Casting of the solution is carried out using known techniques. Various options are available for coating supports with thin films and these include dip coating, vapour deposition, spin coating, and spray coating. These techniques will be deemed to be "casting" according to the invention.

Where the support is a hollow fiber the term casting will typically mean dipping or spray coating of a hollow fiber support. Where the selective layer is located within the hollow fiber the term casting covers the process described above.

The casting solution is typically aqueous but other solvents can be used.

The casting solution preferably has a solids content of 0.01 to 20 wt %, preferably 0.05 to 10 wt %, preferably 0.05 to 5.0 wt %, more preferably 0.1-3.0 wt % ('solids' herein refers to the content of polymeric matrix, and graphene oxide nanofiller only in the casting solution). The mobile carrier is likely to dissolve in the casting solution.

For casting onto flat sheet supports, the cast solution preferably has a solids content of 0.1-10 wt %, preferably 0.5-5.0 wt %. For casting onto hollow fiber supports, the cast solution preferably has a solids contents of 0.01-1.0 wt %, e.g. 0.05-0.5 wt %. Obviously, the relative amounts of polymeric matrix, graphene oxide nanofiller and mobile carrier in the casting solution depend on the desired concentrations in the selective layer polymer(s).

Once the solution is cast onto to a flat support, a bar coating method is used to prepare the selective layer. The bar coating method flattens the selective layer, aligns the nanofillers, and reduces the thickness of the selective layer as desired. A Meyer bar is typically used and it is shown in FIG. 3.

Composite Membrane

The thickness of the selective layer will vary depending on the concentration of the solute in the casting solution with higher concentration solutions giving thicker membranes. Thickness can also be adjusted however using a casting knife or is reduced using the bar coating method. In a typical embodiment, therefore, the membrane is prepared by casting. In particular, the polymeric matrix component is typically dissolved in the casting solution prior to evaporation. The polymeric matrix comprising an amine polymer is typically not formed by interfacial polymerisation, for example.

It will be evident that the polymeric matrix comprising an amine polymer, the graphene oxide nanofiller, and the mobile carrier all typically form a single layer.

The thickness of the selective layer of the invention may be of less than 100 μm, preferably less than 10 μm, more preferably less than 1 μm, more preferably less than 500 nm. Typically, the thickness of the selective layer is in the range 20 nm to 100 μm, preferably 50 nm to 10 μm, preferably 100 nm to 5 μm, more preferably 100 nm to 1 μm, more preferably 100 nm to 500 nm. Thin selective layers tend to have higher permeance values but are also less strong. Selective layers that are less than 200 nm in thickness are especially preferred.

It will also be appreciated that any selective layer is ideally defect free.

The thickness of the support on which the selective layer can be carried can vary although this may be of the order of 50 to 500 μm, e.g. around 100 μm. It will be appreciated, however, that this invention covers both the use of a flat support as well as the use of a hollow fiber support. When the support is a hollow fiber support the thickness of the support is regarded as the wall thickness of hollow fiber. The support should be porous.

After formation of the selective layer on the support, the solvent is removed, e.g. by evaporation. This can be achieved using gentle heat if necessary, e.g. about 60° C.

To avoid any possible loss of selective layer forming material into the support, it is normal if there is a reasonable difference between the average molecular weight of the selective layer polymer(s) and the molecular weight cut-off of the support structure. Such a difference may be larger than about 10,000, such as larger than about 15,000, for example larger than about 20,000, especially more than 50,000. Alternatively, a pore filling material can be used prior to casting with the casting solution containing the selective layer components.

The formed selective layer can then be cross-linked if desired. Cross-linking could be effected chemically using cross-linking agents such as glutaraldehyde or ammonium fluoride. As noted above however it is preferred if the selective layer is not cross-linked.

It is also at this stage of the manufacturing process that thermal treatment of the composite membrane can be effected.

The resulting membrane acts as a fixed site carrier (FSC) for gas, e.g. carbon dioxide, transport due to the high concentration of amino groups.

The composite membranes of the invention can be fashioned into modules for use in gas separation systems.

Application

Tests have shown that composite membranes of the invention can be used for at least 800 hours without any significant loss of activity and this forms a further aspect of the invention.

The composite membranes of the invention operate most effectively when they are humid. Before use of the composite membranes therefore, they may be swelled in the presence of water, e.g. in the form of vapour. Ideally, the composite membranes of the invention should operate in a humid environment, e.g. at least 75% relative humidity, such as 75 to 100% humidity.

The process for the preparation of the composite membranes of the invention therefore preferably further comprises a step of contacting the composite membrane with water, e.g. with water vapour and/or operating the membrane in a humid environment.

It is envisaged that the presence of water vapour in the composite membrane facilitates carbon dioxide transport across the composite membrane.

Gases which can be separated from gas mixtures using the composite membranes of the invention include carbon dioxide with various components such as nitrogen, methane, carbon monoxide, oxygen, volatile organic compounds or hydrogen. Separation of mixtures involving hydrogen is also envisaged. These gases can occur in any circumstance such as in industrial and domestic gas streams.

In use, the gas mixture to be separated will typically flow across the composite membrane under pressure. The temperatures employed can vary but typically at temperatures are in the range of 10 to 90° C., preferably at 20 to 65° C. Temperatures above 40° C., above 50° C., or above 55° C. are preferred. It is possible to work at even higher temperatures however and separation at temperatures of greater than 100° C. may offer improved results.

Preferably, the composite membrane is used to separate carbon dioxide from nitrogen or methane. In this latter regard, the composite membranes of the invention may therefore have applications in the field where these gases are present in mixtures such as flue gas, biogas (e.g. biogas upgrading), natural gas (e.g. natural gas upgrading), syngas, or possibly sweetening of natural gas.

The pressure at which the gas mixture is applied to the composite membrane is important as it affects the flow across the composite membrane and potentially the selectivity thereof. Feed pressures may therefore be in the range of 0.5 to 100 bars, e.g. 1.0 to 20 bars, especially 1.5 to 15 bars. Feed pressure can be in the range of 1 bar (typical flue gas)—80 bar (typical natural gas). The composite membrane of the invention is most useful for application at pressures below 10 bar.

It may be advantageous to operate the composite membrane with a vacuum on the permeate side of the membrane, especially when the feed gases are at low pressures, e.g., 1.0 to 5 bars. This may enhance composite membrane performance.

The composite membranes of the invention preferably exhibit selectivities of at least 20, more preferably at least 50, especially at least 100, most especially at least 150. Selectivity is measured as described in the examples.

Permeance values in GPU (where 1 GPU=$10^{-6}$ cm$^3$(STP) cm$^{-2}$ s$^{-1}$ cmHg$^{-1}$=3.35×$10^{-10}$ mol m$^{-2}$ s$^{-1}$ Pa$^{-1}$) are preferably at least 700, preferably at least 800, preferably at least 1000, preferably at least 1050. Preferred ranges include 1050-6000, preferably 1080-4000.

The composite membranes of the invention have been found to have increased flux compared to membranes without the nanofiller and without the mobile carriers. In a particular embodiment, the membrane of the present invention has a $CO_2$ flux of more than 300 NL m$^{-2}$ h$^{-1}$, preferably more than 350 NL m$^{-2}$ h$^{-1}$, more preferably more than 370 NL m$^{-2}$ h$^{-1}$. Preferably, the membrane of the present invention has a $CO_2$ flux in the range 370-1000 NL m$^{-2}$ h$^{-1}$.

The invention will now be further described with reference to the following non-limiting examples and figures.

MATERIALS

Figure 1:
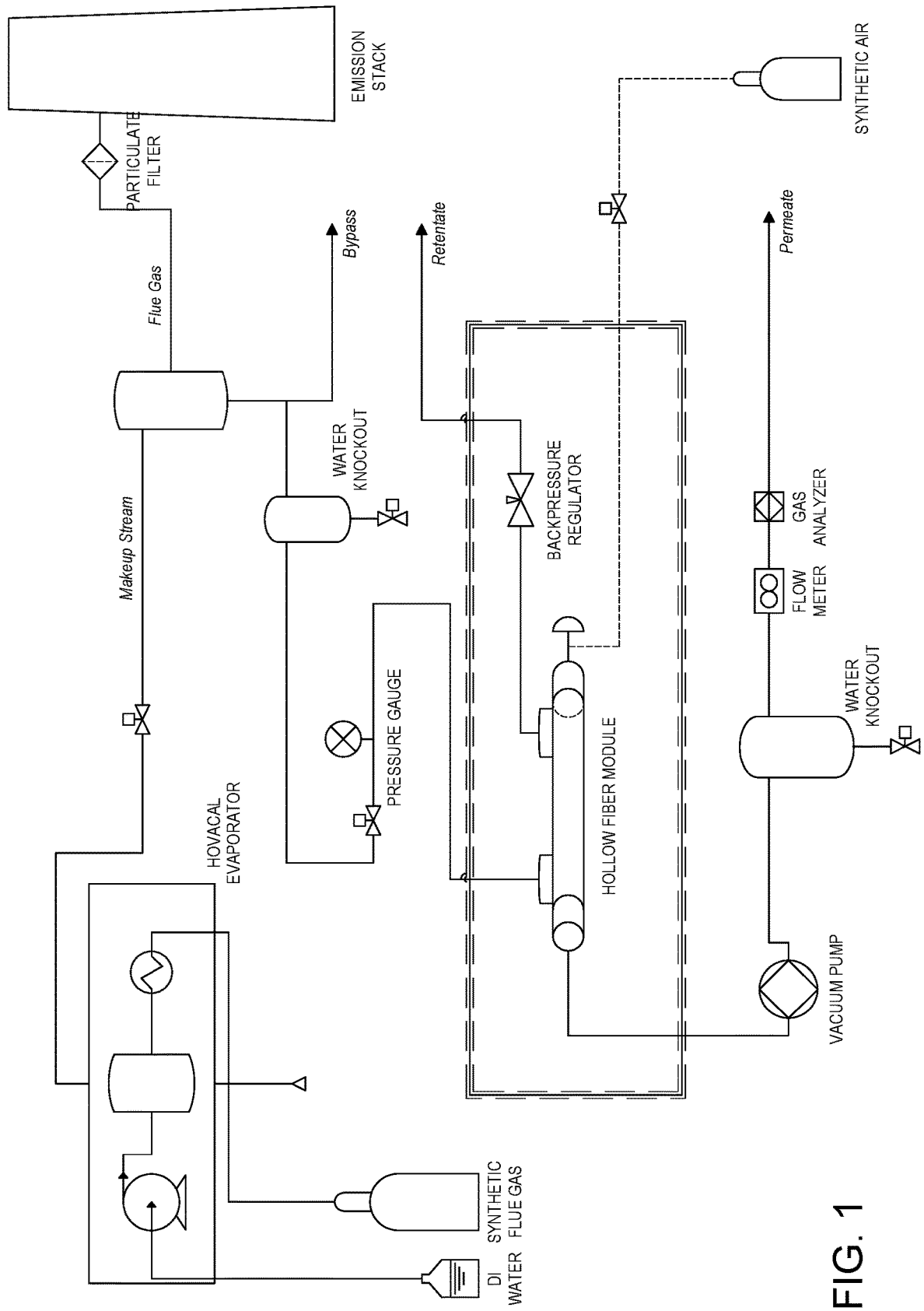
FIG. 1 is a process flow chart for the gas permeation test. Flue gas from cement kiln is used as the feed gas in the permeation test. A membrane pump (KNF Model N036-ST-11-E) is used to suck the flue gas from the chimney. The basic operation conditions are feed flow 10 L/min; feed pressure 1.7 bar; temperature 60° C.; no sweep gas. Synthetic flue gas ($CO_2/O_2/N_2$ mixture, 12.6/14/73.4% vol) is used as the make-up gas to adjust the water content in the feed gas by using a water evaporator (IAS Model HOVACAL).

Poly(allylamine hydrochloride) (Mw=120,000-200,000) was purchased from Thermo Fisher Scientific, Sweden, and was purified and modified into sterically hindered polyallylamine.

For hollow fiber studies, Graphene Oxide powder (2.5 wt % in water) was supplied by Graphene-XT, Italy and used as diluted dispersions.

Polyvinyl alcohol (Mw=89,000-98,000, 89% hydrolyzed), 1-Ethyl-3-(3-dimethylaminopropyl) carbodiimide, N-hydroxysulfosuccinimide, 8-arm-poly (ethylene glycol)-NH$_2$ (hexaglycerol core, Mn=10,000), were used as received from Sigma-Aldrich. Polyvinylidene fluoride (PVDF) ultrafiltration membrane (50 k MW) with polypropylene (PP) substrate was obtained from Synder Filtration, USA.

3M™ Fluorinert™ Electronic Liquid FC-72 was used as received from Kemi-Intressen, Sweden.

L-proline Reagentplus® (≥99 wt %), 1-(2-Aminoethyl) piperazine (99 wt %), 1-Ethyl-3-methylimidazolium acetate (97 wt %) and sarcosine (N-Methylglycine) (98 wt %) were purchased from Sigma-Aldrich.

Poly (p-phenylene oxide) (PPO) hollow fibers used for hollow fiber supports with inside diameter of 350 μm and outside diameter of 540 μm was obtained from Parker A/S Norway.

$CO_2/N_2$ mixture (10 vol. % $CO_2$ in $N_2$), $CO_2/CH_4$ mixture (40 vol. % $CO_2$ in $CH_4$), $N_2$ and $CH_4$ (99.95%), used for permeation tests, were supplied by AGA, Norway. Hydrogen peroxide ($H_2O_2$, 30% in water) used in the modification of GO was supplied by Sigma Aldrich, Norway.

Characterization Methods

Chemical changes to nanofillers were monitored by Fourier-transform infrared (FTIR) spectroscopy using Thermo Nicolet Nexus spectrometer equipped with smart endurance reflection cell in attenuated total reflectance mode with a diamond crystal. An average of 16 scans with a resolution of 4 cm$^{-1}$ was used in the range of 4000 cm$^{-1}$ and 800 cm$^{-1}$ to build the spectra.

The surface chemical composition of synthesized GO was analysed with an X-ray photoelectron spectroscopy (XPS, XPS-theta probe, Thermo Fisher Scientific Co., USA) equipped with a monochromatic Al Kα source with C-correction of 284.5 eV.

Membrane morphologies were analysed by Field Emission SEM APREO (FEI, Thermo Fisher Scientific, USA) equipped with an in-lens detector under immersion mode. Before analysis, the samples were sputter-coated with 8 nm Pd/Pt alloy.

Polymers

Polymer Example 1—Synthesis of Sterically Hindered Polyallylamine (SHPAA)—For Flatsheet Membranes Sterically hindered polyallylamine was obtained by modification of purified polyallylamine with 2-bromopropane. Poly allylamine reacts with 2-bromopropane in the presence of stoichiometric amounts of KOH at 50° C. under reflux conditions in methanol yields poly-N-isopropyl allylamine, as shown in reaction Scheme 1.

Scheme 1. Steric hindrance of polyallylamine

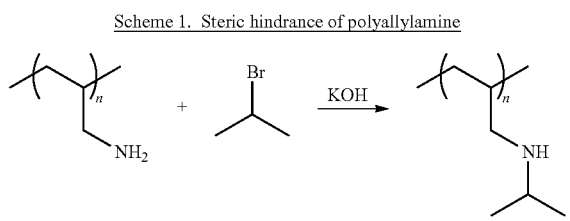

The poly-N-isopropyl allylamine prepared herein has an estimated Mw of 120 to 250K.

Polymer Example 2—Synthesis of Sterically Hindered Polyallylamine (SHPAA)—For Hollow Fibers Polyallyl amine hydrochloride was purified by reacting with equivalent amounts of KOH in MeOH precipitating KCl. Subsequently, purified PAA was modified in to poly-N-isobutyl allyl amine by reaction with equivalent amount of 2-bromobutane and KOH in MeOH at 50° C. (Scheme 2). The resulting polymer was purified by separating precipitated KCl crystals followed by drying in $N_2$ atmosphere at 60° C.

Scheme 2. Steric hindrance of poly allylamine

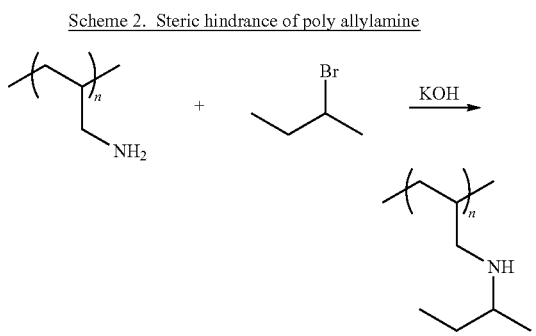

The polymer prepared has an estimated Mw of 120 to 250 K

Mobile Carrier

Synthesis of Mobile Carriers

Equivalent amounts of i-proline and KOH were dissolved in DI water to form a solution of 10 wt % total solids. The solution was then stirred at high speed in room temperature overnight to form potassium L-prolinate (ProK).

Similarly, equivalent amounts of 1-(2-Aminoethyl) piperazine and sarcosine were stirred in calculated quantities of DI water at room temperature to obtain 37.7 wt % of 2-(1-piperazinyl) ethylamine sarcosinate (PZEA-SARC).

1-Ethyl-3-methylimidazolium acetate ([Emim][OAc]) was dissolved in DI water to form a 10 wt % solution and stirred overnight at room temperature.

Nanofillers

Nanofillers for the flat sheet membrane examples were prepared as follows:

GO Example 1 Synthesis of Graphene Oxide

Graphene oxide used in the flat sheet membranes was synthesized through modified Hummer's method. 10 g of graphite powder was mixed with 450 ml of Sulphuric acid under stirring at 5° C. for 1 h. 30 g of potassium permanganate was then added and stirred for 30 minutes, resulting in a colour change from black to dark green. The solution was further heated up to 40° C. for 1 h. 450 ml of deionized water was added dropwise and carefully to avoid a rapid increase in temperature. The solution is characterized by a colour change to dark brown at this point. The temperature was then maintained at 95° C. for 30 minutes followed by adding 300 ml of 10% hydrogen peroxide solution and then stirred for 15 minutes. The colour change to light brown marked the successful synthesis of graphene oxide. The GO was then purified multiple times with about 5 L of 10% hydrochloric acid through a Whatman glass microfiber filter followed by washing in 3 L of acetone. The filtered GO cakes were then dried at 40° C. for two days under vacuum to give graphene oxide flakes named GO herein.

A 2 mg ml$^{-1}$ solution of GO was prepared, and tip sonicated for up to 3 h followed by bath sonication for 30 mins. AFM analysis revealed the presence of flakes in this solution with lateral dimensions of 1 μm or more.

GO Example 2—Physical Modification of Graphene Oxide

In order to physically modify GO flakes for better diffusion of penetrants, random pores were introduced by hydrothermal treatment of GO example 1 using hydrogen peroxide. 1M NaOH was used to adjust pH of 75 ml of 1 mg ml$^{-1}$ GO solution (diluted from the 2 mg ml$^{-1}$ solution prepared earlier) was taken and the pH was adjusted to 10 using 1M NaOH solution. The mixture was stirred for 5 mins at high speed followed by bath sonication for 10 mins. 10 ml of 3% dilute hydrogen peroxide solution was then added to the mixture and the solution is stirred for 10 mins at high speed followed by bath sonication for 10 mins. The resulting mixture is then treated at 180° C. in a Teflon autoclave for 6 h and then cooled down to room temperature.

The resulting pGO (porous graphene oxide) dispersion in the water had a concentration of about 1 mg ml$^{-1}$ (pGO). The flakes are expected to inherit the same lateral dimensions as GO from example 1.

GO Example 3—Chemical Modification of Graphene Oxide

PEG groups were grafted onto the GO surface using the EDC coupling reaction. Synthesized GO dispersion in water is acidic. However, in order to activate multiple sites for PEG grafting for amide bond formation, further carboxylic groups on GO surface were introduced by treating 20 ml of 4 mg ml$^{-1}$ GO dispersion from Example 1 with an equal volume of 3M NaOH followed by bath sonication for 1 h at 25° C. This reaction enabled the conversion of esters in GO to be hydrolyzed into carboxylic groups. Dilute HCl was then added to neutralize the solution followed by dilution to 1 mg ml$^{-1}$, obtaining a dispersion of carboxylated GO in water. 100 mg of NHS and 150 mg of EDC was then added to the GO—COOH dispersion, followed by bath sonication in ice for 30 mins to activate the catalysts. 200 mg of 8-arm PEG was then added to the mixture, and the solution was stirred at room temperature for 24 h. The solution was then centrifuged at 7000 rpm to remove aggregates, and the dispersion was then dialyzed in water using Dialysis membrane Spectra/Por® 3 to remove the catalysts, salts and other unreacted components. The residual dispersion had a GO—PEG concentration of about 1 mg ml$^{-1}$.

The flakes are expected to inherit the same lateral dimensions as GO from example 1.

Nanofillers for the hollow fiber composite membrane examples are prepared as follows:

GO Example 4—GO/pGO Nanosheets—for Hollow Fiber Composite Membranes

An important parameter of GO flakes that influence the gas permeation performance is the flake size (lateral dimensions). Different suppliers of GO provide dispersions of different flake size. For hollow fiber composite membrane experiments, we used GO from commercial supplier Graphene-XT.

The GO dispersion as received was first diluted to 1 mg g$^{-1}$ solution followed by pH adjustment to 10 using 1M NaOH. The diluted solution was sonicated in a bath sonicator for 30 minutes at 25° C. The dispersion is then subject to ultrasonic disintegrator (Vibra-Cell™ Ultrasonic Liquid Processor) at an amplitude of 60% in an ice bath with a 3 second pulse followed by 2 second break. This procedure was carried out to simultaneously exfoliate and control the size of GO flakes by varying the time of operation.

The sonication was carried out for 3, 6 or 9 h and the resulting GO flakes was referred to as GO3, GO6, and GO9, respectively.

Sonication-assisted exfoliation procedure was employed to obtain monolayers of GO in water dispersion. In order to ensure the reproducibility of the methodology, the concentration of GO dispersion was kept constant at 2 mg mL$^{-1}$ and the sample volume was maintained at 300 mL for all procedures. Sonication process imparts random fragmentation of 2D nanosheets induced by mechanical failure of defective sp$^3$ regions. These random lacerations are followed by propagation of cracks leading to reduced flake sizes.

AFM analysis revealed the presence of large flakes with lateral dimensions more than 1 μm for GO3. Subsequent sonication resulted in smaller flakes in the range of 400-800 nm and down to less than 500 nm for GO6 and GO9 respectively. All samples were then subject to hydrothermal treatment for introduction of random pores.

The size controlled GO dispersions were also hydrothermally treated to introduce random non-selective pores. The GO dispersion was mixed with 3 wt % H$_2$O$_2$ solution and the mixture was stirred vigorously for 10 mins followed by bath sonication for 10 mins. Thereupon, the mixture is treated in a Teflon autoclave for 6 h at 180° C. The resulting pGO dispersions derived from GO3, GO6 and GO9 samples were named as pGO3, pGO6 and pGO9, respectively.

The successful introduction of non-selective pores in GO nanosheets through the hydrothermal treatment is confirmed by representative S(T)EM imaging of GO3 and pGO3.

Representative imaging of pGO flakes show further reduction in flake size after the hydrothermal treatment. This size reduction is confirmed with relative increase in presence of carbonyl groups (observed from FTIR) that are exposed along the edges of the pGO when compared to GO.

Chemical changes in the GO nanoplatelets during the hydrothermal treatment process was studied using FTIR spectroscopy. The sonication procedures barely affected the chemical structure of the GO and pGO nanoplatelets.

However, discernible peak changes appeared between the GO and pGO.

Support

Flat Sheet

The flat sheet support was PVDF as a flat sheet. It had a MWCO of 50,000. The PVDF support was first washed in tap water at 45° C. for 1 h followed by DI water for 30 mins to remove the pore protective agent. The support was dried at room temperature overnight prior to coating with a casting solution using a bar coating machine (See FIG. 3). Pore filler FC-72 was used to fill the pores to avoid pore penetration of the casting solution.

Hollow Fiber Support

PPO was used as the hollow fiber support. It has a MWCO of 30,000 to 50,000. To fabricate hollow fiber supports, the PPO supports prepared by conventional hollow fiber spinning techniques were hung vertically with the ends sealed using paper clips which also create tension and avoids slackening of fibers. DI water was used to wash the fibers two times to remove possible dust particles sticking to the surface followed by drying in room temperature.

Composite Membrane Formation

Flatsheet Membranes 4 wt % PVA solution in water was prepared by dissolving PVA pellets in deionised water at 80° C. for 4 h under reflux conditions. The SHPAA solution in methanol post modification (polymer example 1) was dried at 60° C. under vacuum overnight to remove residual solvent. The resulting pristine polymer was then dissolved in water for 24 h in room temperature to obtain a 6 wt % solution.

In the case of flat sheet supports, a cast solution concentration of about 1 wt % "solids" was used. The blend polymer solution of SHPAA/PVA consisted of 90 wt % SHPAA and 10 wt % PVA based on the total polymeric "solids" present in the solution. The % amount of nanofillers (from Ex GO1 to GO3), was measured with respect to the total amount of polymer and nanofillers present in the cast solution. For example, a 0.5 wt % GO in SHPAA/PVA blend denotes that the amount of GO is 0.5% of the total "solids" content, i.e. of the polymer and nanofillers in the solution.

The casting solution comprises 1 wt % of a [0.5 wt % and 99.5 wt %] blend of nanofillers and SHPAA and PVA polymer blend was applied to the PVDF support to prepare a selective layer of thickness lower than 200 nm.

Figure 3:
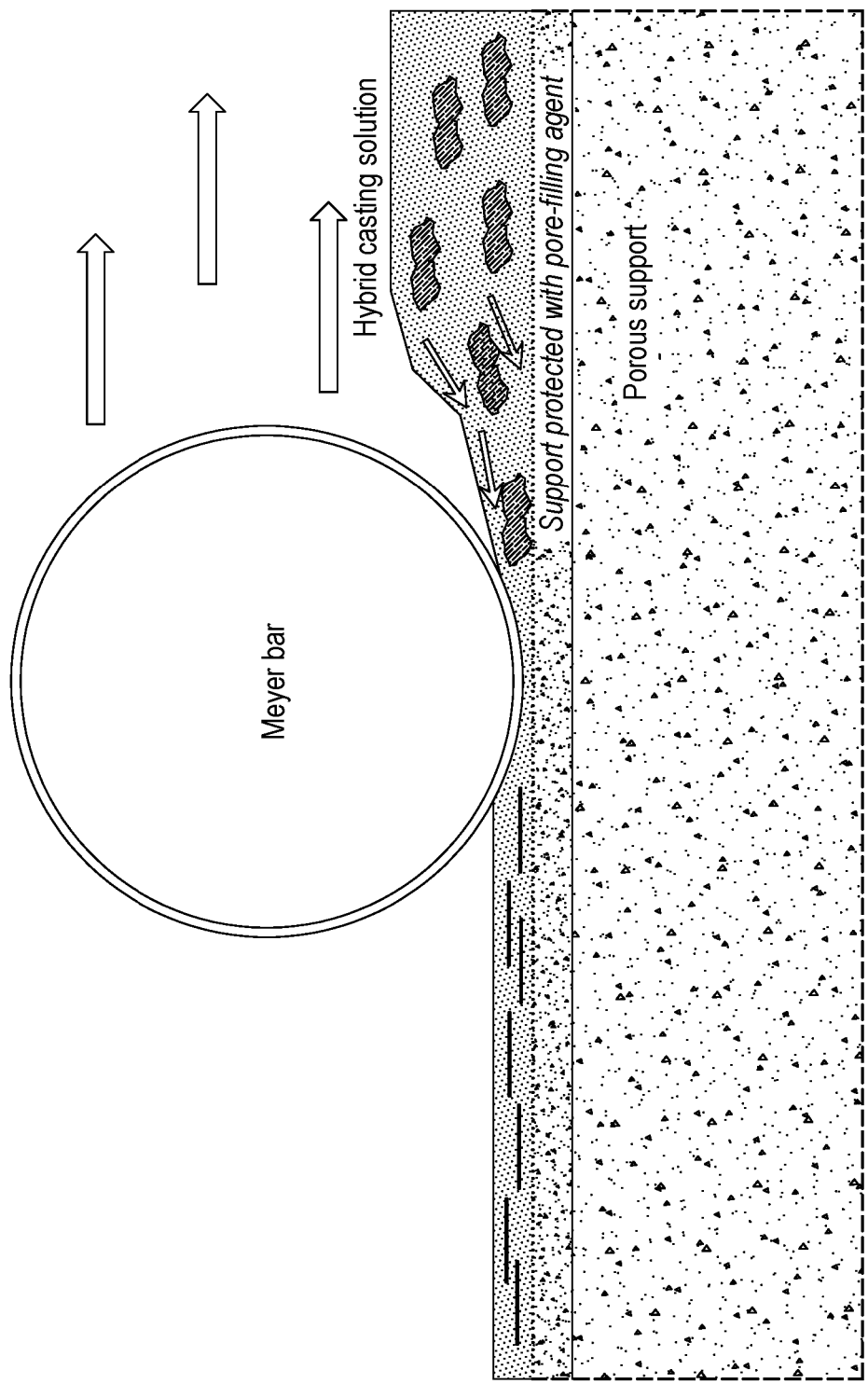
FIG. 3 is a schematic illustration of alignment of GO-based fillers in composite membranes fabricated using bar coating technique.

In this example, the selective layer is applied by the bar-coating method, as schematically represented in FIG. 3.

Hollow Fiber Composite Membranes

Purified and dried SHPAA post-modification (polymer example 2) was dissolved in DI water to obtain a 6 wt % solution and the polymer solution is stirred for at least 2 days at room temperature to obtain a clear polymer solution. In the case of PVA, a 4 wt % solution was prepared by dissolving PVA pellets in DI water at 80° C. for 4 h under reflux conditions.

To prepare the casting solutions, calculated quantities of polymer solutions were added to DI water and diluted to a casting solution concentration of 0.15 wt % total "solids". The amounts of mobile carriers were measured as ratio of polymer phase while the amounts of nanofillers (Ex GO4) were measured in terms of total solid content as described in Equations 1 and 2 respectively—

$$w_{mc} = w_{pol} \times \left[ \frac{1}{(1 - c_{mc})/100} - 1 \right] \quad (1)$$

$$w_{nf} = w_{pol} \times (c_{nf}/100) \quad (2)$$

where $w_{mc}$ is the weight of mobile carrier (g), $w_{pol}$ is the total weight of dry polymer (g), $w_{nf}$ is the weight of nanofiller (g), $c_{mc}$ is the concentration of mobile carrier (wt %) and $c_{nf}$ is the concentration of nanofiller (wt %).

Coating of thin selective layer is achieved by dip coating the fibers using the casting solution in both directions at a constant low speed (in the range of 6-8 cm s$^{-1}$) with a time interval of 30 mins between successive coating procedures. Coating in opposite directions ensures defect-free selective layer. Additionally, the lean viscosity of casting solution owing to the low solid content leads to uniformity of selective layer thickness independent of coating speed and filler loading. The hollow fibers are then dried in room temperature followed by drying at 60° C. under vacuum for 2 hrs to remove residual solvent components. The resulting hollow fibers spectacle shiny appearance due to the presence of ultrathin selective layer coating. The thickness of the selective layer is about 200 nm.

In order to assemble the coated hollow fiber composite membranes into a module, few fibers (in the range of 2-5) were inserted carefully into a pre-assembled stainless-steel hollow fiber module designed using ¼ inch ⅜-inch Swagelok™ fittings. The ends are then sealed using epoxy adhesive. The bore side of the fibers are open by knocking of cured adhesive on an extension mould.

Composite Membrane Morphology

Flatsheet Composite Membranes

Stable dispersions of GO-based fillers with both PVA and SHPAA/PVA blend matrices were obtained at the entire range of GO filler loading from 0.2 wt % to 1 wt %. The blend polymer solution of SHPAA/PVA consisted of 90 wt % SHPAA and 10 wt % PVA based on the total polymeric "solids" present in the solution.

Figure 2:
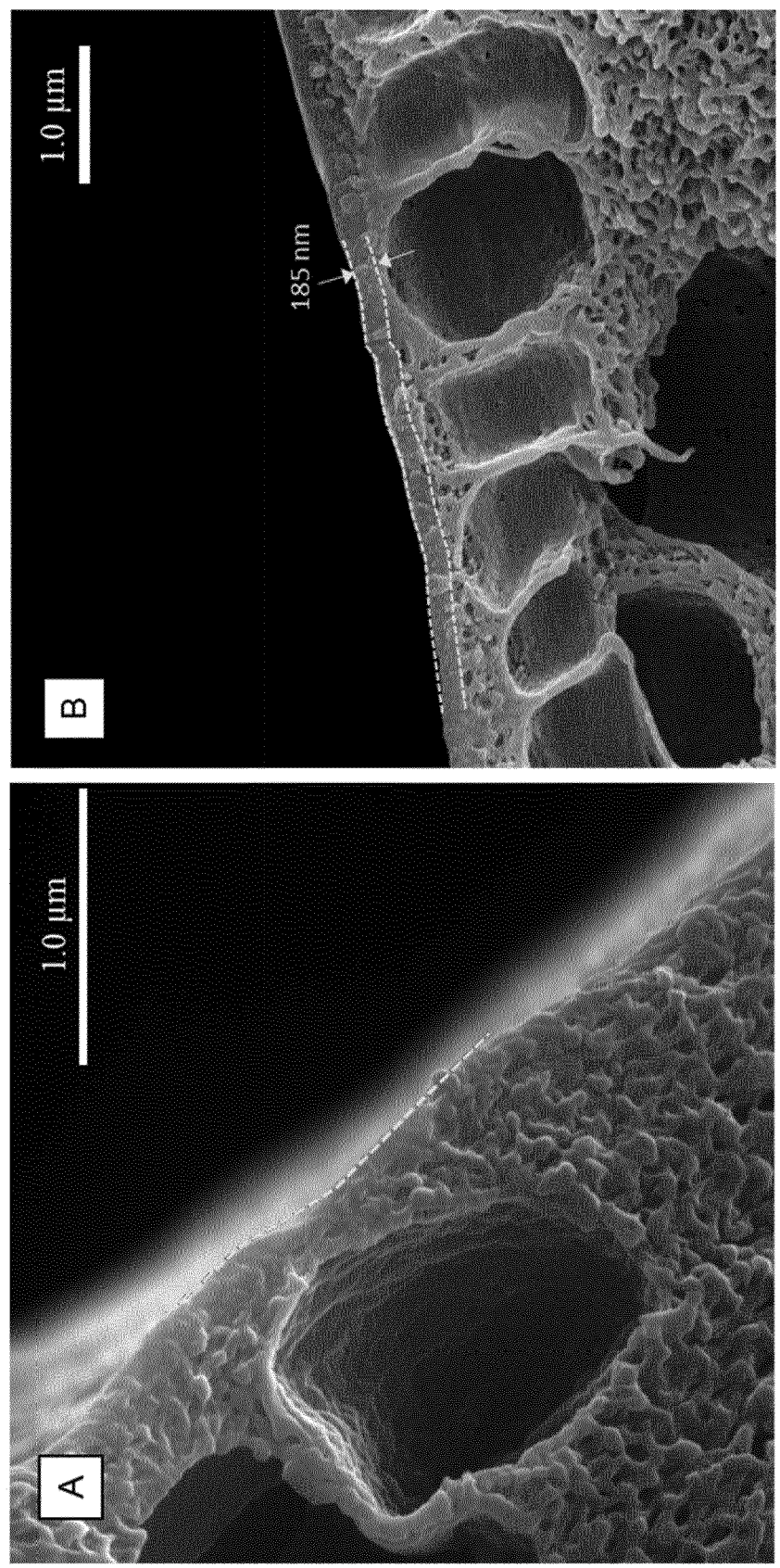
FIG. 2 is a cross-section SEM image of (A) porous PVDF support (B) composite membrane containing SHPAA/PVA with 0.2 wt % pGO

The concentration of casting solutions was maintained at 1 wt % of solids. Representative cross-sectional SEM imaging of 0.2 wt % pGO loaded selective layer reveals the presence of an ultrathin selective layer with a thickness lower than 200 nm on the PVDF porous support. The surface images of the selective layers show visible difference between the neat polymer and those loaded with nanofillers. While neat polymer layers show a relatively smooth surface, dark patches are observed in the composite membrane samples, which could be associated with the aligned GO-based filler flakes. No evident protrusion or aggregation of the nanofillers were observed from the smooth surface, which ascertains the alignment of GO nanoflakes parallel to the coating surface along their larger two dimensions. In-plane alignment of GO is attributed to the lowering of surface free energies of GO-based fillers and the mechanically forced-alignment of the thin 2D flakes into the tangent to the cylindrical surface of the bar at the contact point. FIG. 2 shows cross-section SEM images of (A) porous PVDF support (B) composite membrane containing SHPAA/PVA with 0.2 wt % pGO.

Lab-Scale Gas Permeation Performance

Flatsheet Membranes with Facilitated Transport SHPAA Polymer Matrix

Facilitated transport membranes transport $CO_2$ through a reactive pathway in addition to the solution-diffusion mechanism. The facilitated transport effect is brought in by the amine groups attached to the main chain of the backbone in the SHPAA polymer matrix which reversibly react with $CO_2$ in the presence of water.

Gas Permeation Performance

The composite membranes were evaluated for gas permeation performance using humid mixed gas permeation test rigs. The feed composed of 90/10 v/v $CO_2/N_2$ mixture or 40/60 v/v $CO_2/CH_4$ mixture. The flow rate of the feed was 300 ml min$^{-1}$ for the $CO_2/N_2$ tests and 400-600 ml min$^{-1}$ for the $CO_2/CH_4$ tests. The difference in feed flow rates was mainly to recoup differences in membrane areas and targeting very low stage cut of below 0.5%. The sweep gas for $CO_2/N_2$ tests was $CH_4$ and for the $CO_2/CH_4$ tests, $N_2$ was used. In both cases, feed and the sweep gas streams were humidified in a bubble tank before the membrane module. The shell side of the membranes was used for the feed gas and the bore side of the fibers was used as the permeate/sweep side. The pressure on the feed side was maintained constant at 1.7 bar for the $CO_2/N_2$ tests and varied between 2-20 bar for the $CO_2/CH_4$ tests. Sweep side pressure was held at 1.02 bar. The temperature of operation was maintained at 35° C. for all tests. The exit gas compositions in both feed and sweep side were monitored continuously using a pre-calibrated gas chromatograph (490 Micro GC, Agilent for $CO_2/N_2$ tests and MGS, SRI Instruments Inc. for $CO_2/CH_4$ tests). The permeance of component 'i' was obtained using the following equation $$P_i = \frac{V_p(1 - y_{H_2O})y_i}{(avg(p_{i,f} - p_{i,r}) - p_{i,p})A} \quad (1)$$

Where the total permeate flow $V_p$ is in ml s$^{-1}$ measured at the exit using a bubble flow meter at steady state conditions. $y_{H_2O}$ and $y_i$ denote the molar fraction of the water and permeating species in the permeate flow respectively. Partial pressures $p_{i,f}$, $p_{i,r}$ and $p_{i,p}$ of the species 'i' in the feed, retentate and permeate, respectively, are in cm Hg$^{-1}$. Permeance of components are represented in GPU, where 1 GPU=10$^{-6}$ cm$^3$(STP) cm$^{-2}$ s$^{-1}$ cmHg$^{-1}$=3.35×10$^{-10}$ mol m$^{-2}$ s$^{-1}$ Pa$^{-1}$. The separation factor is calculated using permeance of each component according to the equation $$\alpha_{i/j} = \frac{y_i/x_i}{y_j/x_j} \quad (2)$$

Figure 5:
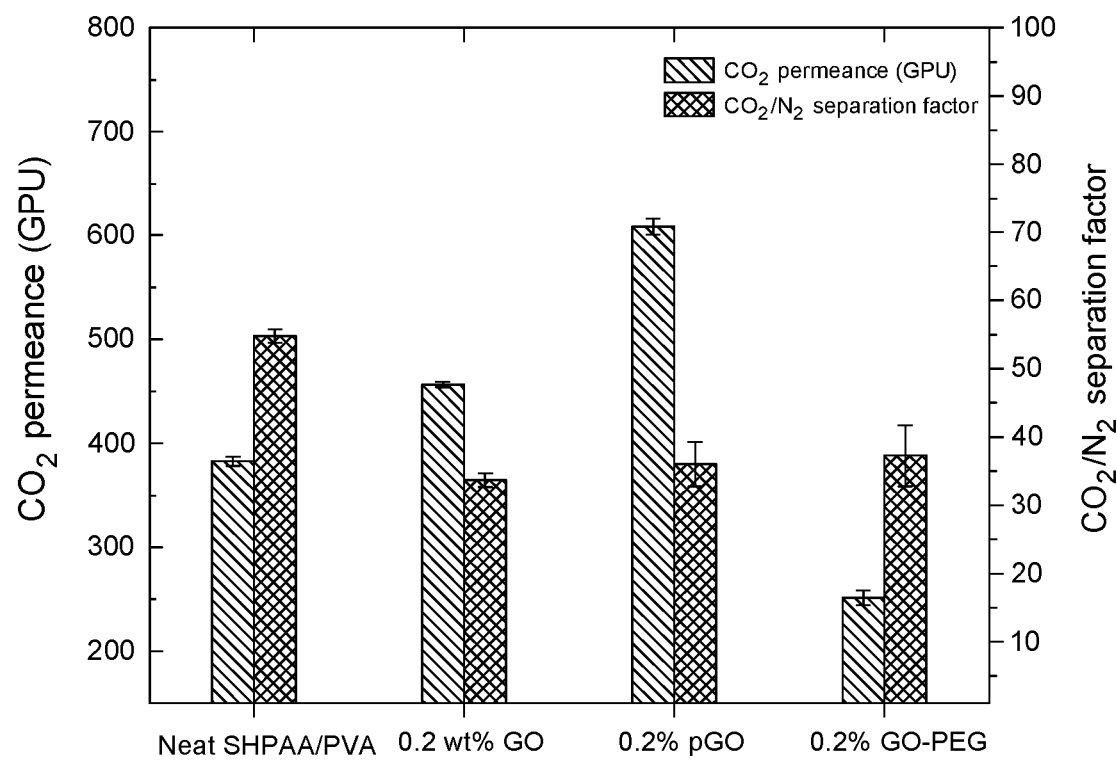
FIG. 5 shows mixed gas permeation performance of various SHPAA/PVA-based selective layers measured at 35° C. for flat composite membranes.

The separation performance of neat SHPAA/PVA blend membrane is $CO_2$ permeance of 383 GPU and a $CO_2/N_2$ separation factor of 55, as shown in FIG. 5.

The separation performance of SHPAA/PVA flat sheet composite membranes with GO-based fillers are summarised in FIG. 5. At a low loading of 0.2 wt %, both GO and pGO effectively disrupt polymer chain packing while simultaneously increasing $CO_2$ sorption and reorienting water distribution in the matrix. Hence the $CO_2$ permeance sharply increases to ~455 GPU in the case of 0.2 wt % GO and to 610 GPU in the case of 0.2 wt % pGO. The selectivity of the membranes containing both GO and pGO at 0.2 wt % loading rapidly decreases to ~34.

A reduced $CO_2$ permeance of ~250 GPU with a $CO_2/N_2$ separation factor of ~37 was observed in the membranes with low loading of GO-PEG. This reduction of performance can be explained with the effect of filler loading. Membranes with GO-PEG feature as a classic case of the rigidified interface between nanofiller and polymer matrix. Due to the strong interactions between —OH groups and the amine-containing facilitated transport matrix, there exists a compactly packed polymer interface between the GO surface the adjacent polymeric matrix. The tightly packed chains that form a rigidified interface volume in conjugation with the GO barrier property leads to reduced permeance of $CO_2$ while increasing the $CO_2/N_2$ selectivity markedly at higher loadings. Thus, the $CO_2/N_2$ separation factor sharply rose to ~90 while reducing the $CO_2$ permeance down to 205 GPU at a high loading of 1 wt % filler.

A similar effect was seen with higher loading of GO nanoplatelets, where the tortuous pathways for $N_2$ permeation due to the multi-layer alignment of GO leads to increased $CO_2/N_2$ separation factor of about 65 at 1 wt % loading. Thus, the optimal loading of GO-based fillers for enhanced permeation was observed at 0.2 wt %, above which the effect of barrier property of GO and hence the tortuosity to gas permeation is simultaneously manifested. At this loading, the enhanced permeation of $CO_2$ due to the polymer chain disruption and increased sorption brought about by the high aspect ratio nanoplatelets counteracts with the resistance caused by the additional tortuosity of the impermeable platelets.

In the case of pGO, the presence of non-selective pores reduces the tortuosity, but the presence of bulk distribution of small-sized impermeable platelets is still significant. Hence, there is a decline in $CO_2$ permeance with increasing filler loading, although not as steep as in the case of GO or GO-PEG.

Figure 6:
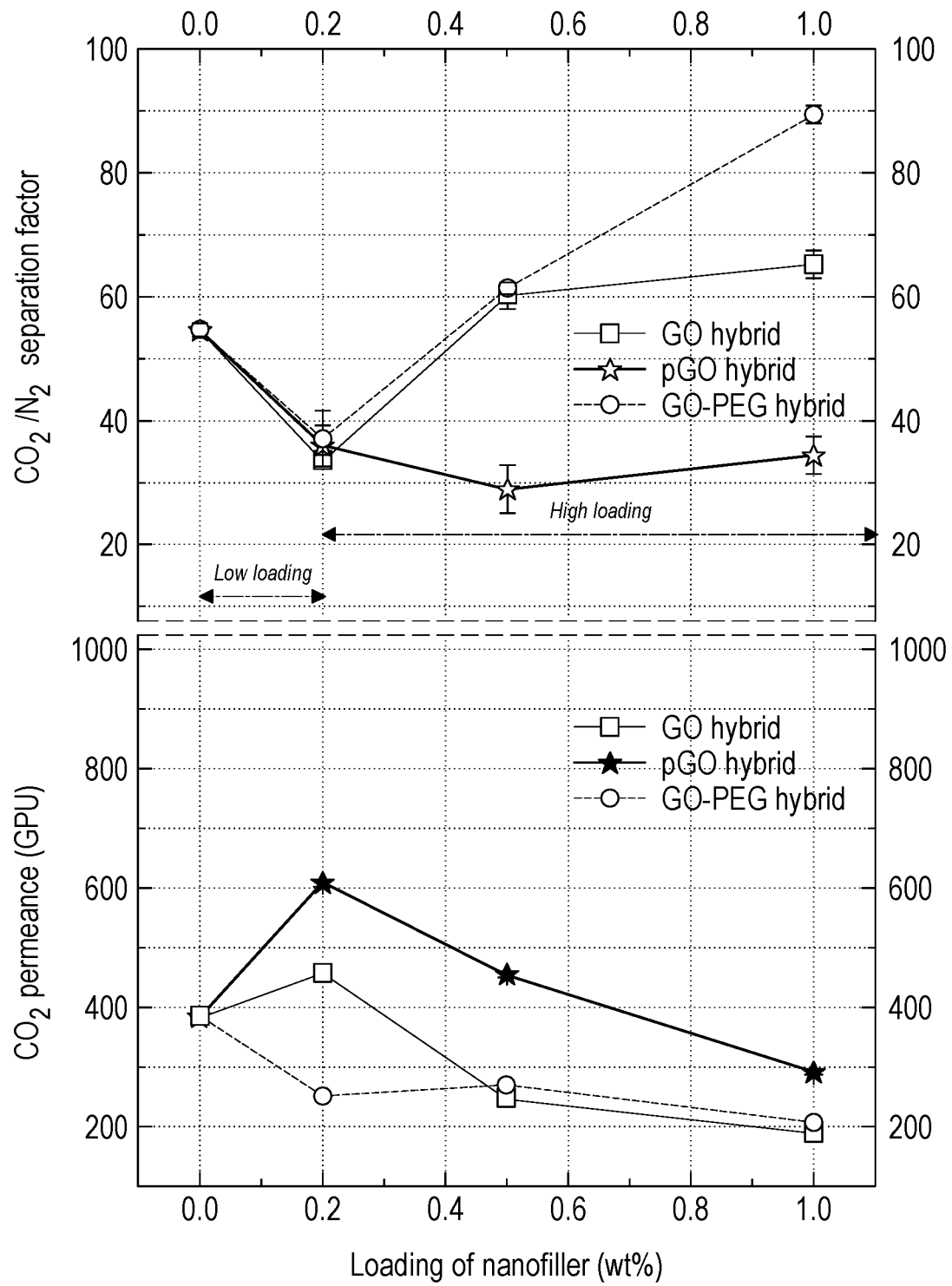
FIG. 6 shows a mixed gas permeation performance of SHPAA/PVA-composite membranes with GO-based fillers as a function of filler loading measured at 35° C. for flat composite membranes.

FIG. 6 shows the effect of nanofiller loading on permeance and selectivity.

So the skilled person is able to tailor membrane properties to favour permeance or selectivity by varying the nanofiller content.

Lab-Scale Gas Permeation Performance

Hollow Fiber Membranes

Figure 4:
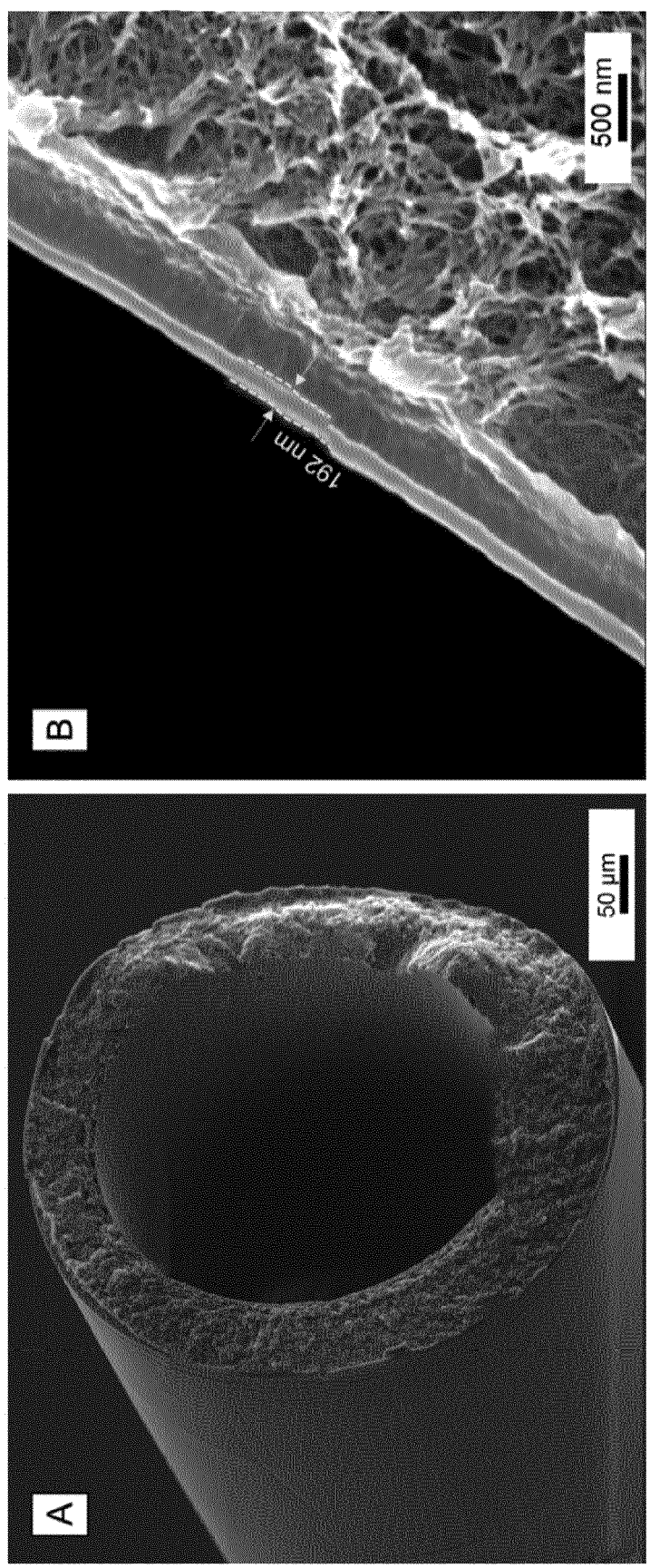
FIG. 4 is an SEM imaging of neat SHPAA/PVA composite membrane freeze-fractured hollow fiber (A) and cross-section (B).

Both GO and pGO nanofillers (GO example 4) were dispersed in SHPAA/PVA solution at two filler loadings of 0.2 wt % and 0.5 wt % in the selective layer. The total solid content in the casting solution (i.e. polymer+GO total) was maintained low at 0.15 wt % (polymer-based) that resulted in an ultrathin selective layer thickness of ~200 nm on the PPO hollow fibers. Mobile carriers are also added in amounts shown below. FIG. 4 shows a composite membrane of the invention with neat polymerin the selective layer. The facile dip coating procedure also ensures in-plane alignment of GO due to shear alignment.

Both GO and pGO-based hollow fiber membranes were developed where the size of the GO was varied with sonication time resulting in GO3/6/9 and corresponding pGO3/6/9. Testing followed the protocol explained above for the flat sheet membranes. The neat polymeric membranes with SHBPAA/PVA exhibited a $CO_2$ permeance of 407 GPU and a $CO_2/N_2$ separation factor of 32.2.

Figure 7:
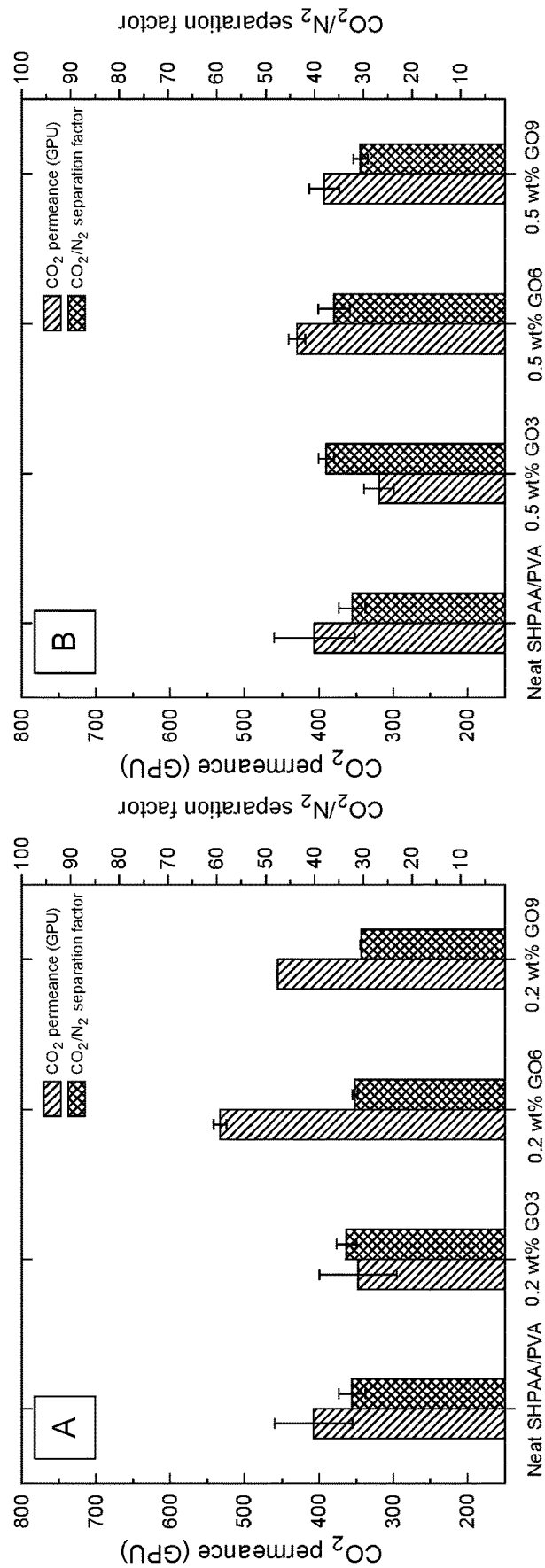
FIG. 7 shows a $CO_2/N_2$ mixed gas permeation performance of various (A) 0.2 wt % (B) 0.5 wt % loaded GO-based membranes measured at 35° C. for hollow fiber composite membranes.
Figure 8:
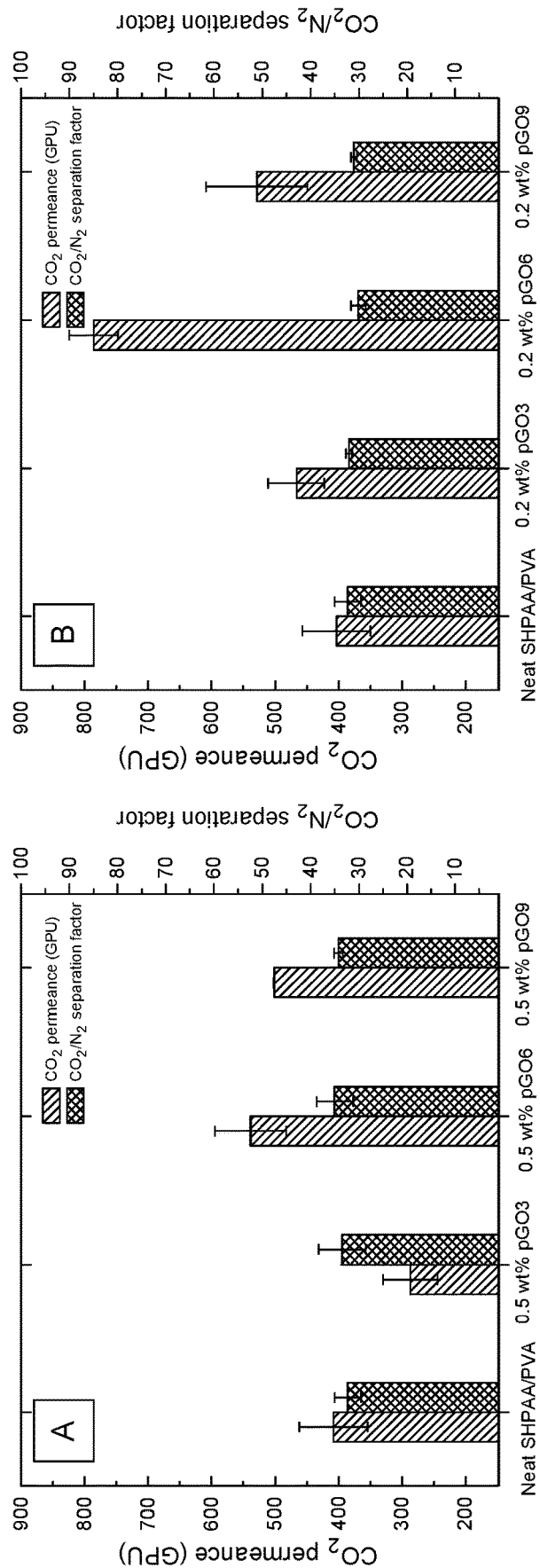
FIG. 8 shows a $CO_2/N_2$ mixed gas permeation performance of various (A) 0.2 wt % (B) 0.5 wt % loaded pGO-based membranes measured at 35° C. for hollow fiber composite membranes.

A small addition of pGO6 (optimized from FIGS. 7 and 8) at 0.2 wt % doubled the permeance up to 790 GPU with the selectivity remaining at 31. FIGS. 7 and 8 demonstrate that there is both an optimum loading of nanofiller and an optimum size of nanofiller.

Addition of Mobile Carriers

Hollow Fiber Membranes with Mobile Carriers

In order to increase the amount of reactive sites for the $CO_2$ to interact in the selective layer, low molecular weight $CO_2$-philic components were added. These are referred to as mobile carriers as they diffuse through the membrane matrix and enhance permeation.

Figure 9:
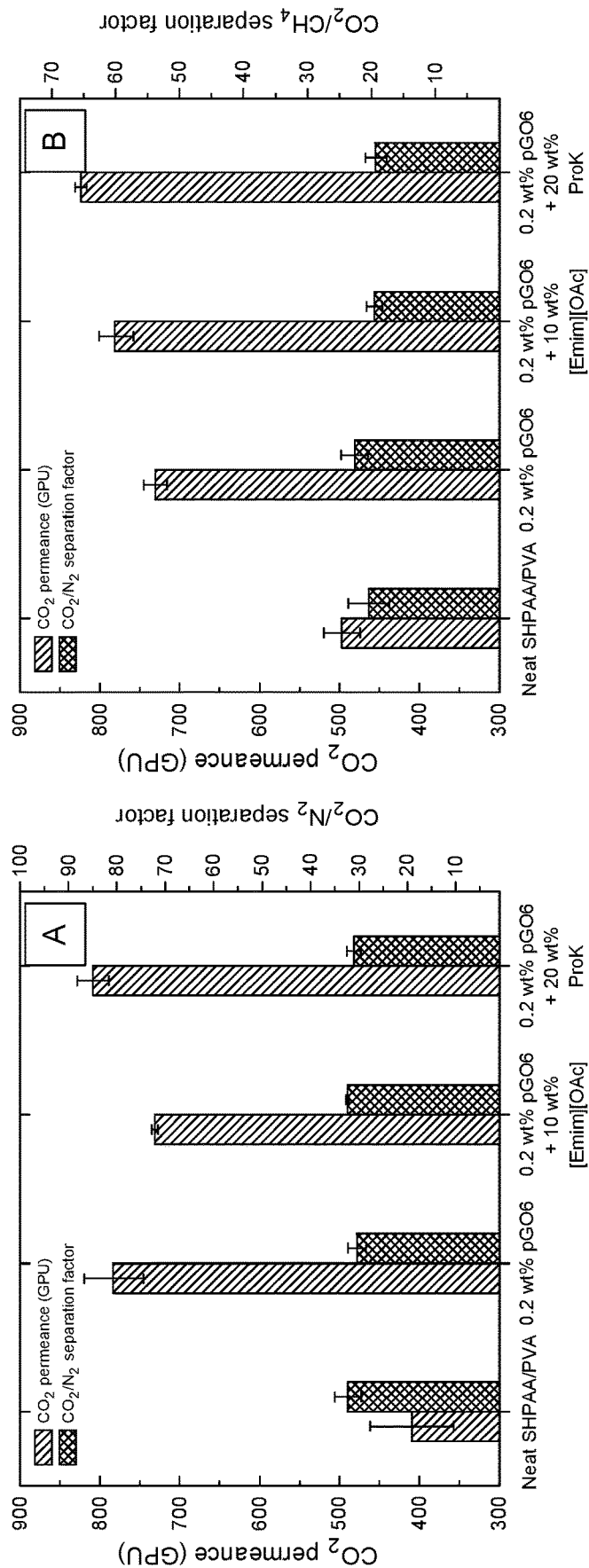
FIG. 9 shows mixed gas permeation performance of various composite membranes measured at 35° C. for (A) $CO_2/N_2$ gas pair at 1.7 bar and (B) $CO_2/CH_4$ gas pair at 2 for hollow fiber composite membranes.

0.2 wt % of pGO was dispersed in polymer matrix containing 10 wt % [Emim][OAc] or 20 wt % ProK. The compositions were chosen according to the optimal composition detected in the experiments and reported in the previous sections. These resulting composite membranes with mobile carriers had an increased performance for $CO_2/N_2$ separation for ProK containing membranes, increasing the $CO_2$ permeance up to 810 GPU as seen in FIG. 9A. Even better results are demonstrated with $CO_2/CH_4$ separation performances as seen in FIG. 9B. For these tests, the feed gas consisting of 40/60 v/v $CO_2/CH_4$ mixture, mimicking typical biogas composition was used. Both mobile carriers containing membranes were characterized with a marked increase in $CO_2$ permeance while the $CO_2/CH_4$ separation factor remained constant around 20. The composite membrane containing 0.2 wt % pGO6 with 20% ProK peaked at a $CO_2$ permeance of 825 GPU with a $CO_2/CH_4$ separation factor of 20, while the neat polymer had a $CO_2$ permeance of 497 GPU with a $CO_2/CH_4$ separation factor of 21 at a feed pressure of 2 bar. The corresponding composite membrane containing 0.2 wt % pGO6 without mobile carriers was limited to 727 GPU with $CO_2/CH_4$ feed gas mixture. A similar increase in $CO_2$ permeance of 10% [Emim][OAc] containing membrane up to 782 GPU was observed. The mobile carriers containing membranes exhibited an increased $CO_2$ permeance at the total upstream pressure of 2 bar with the $CO_2/CH_4$ feed mixtures due to the increased partial pressure $CO_2$ and lower stage cut (higher feed flow).

Figure 10:
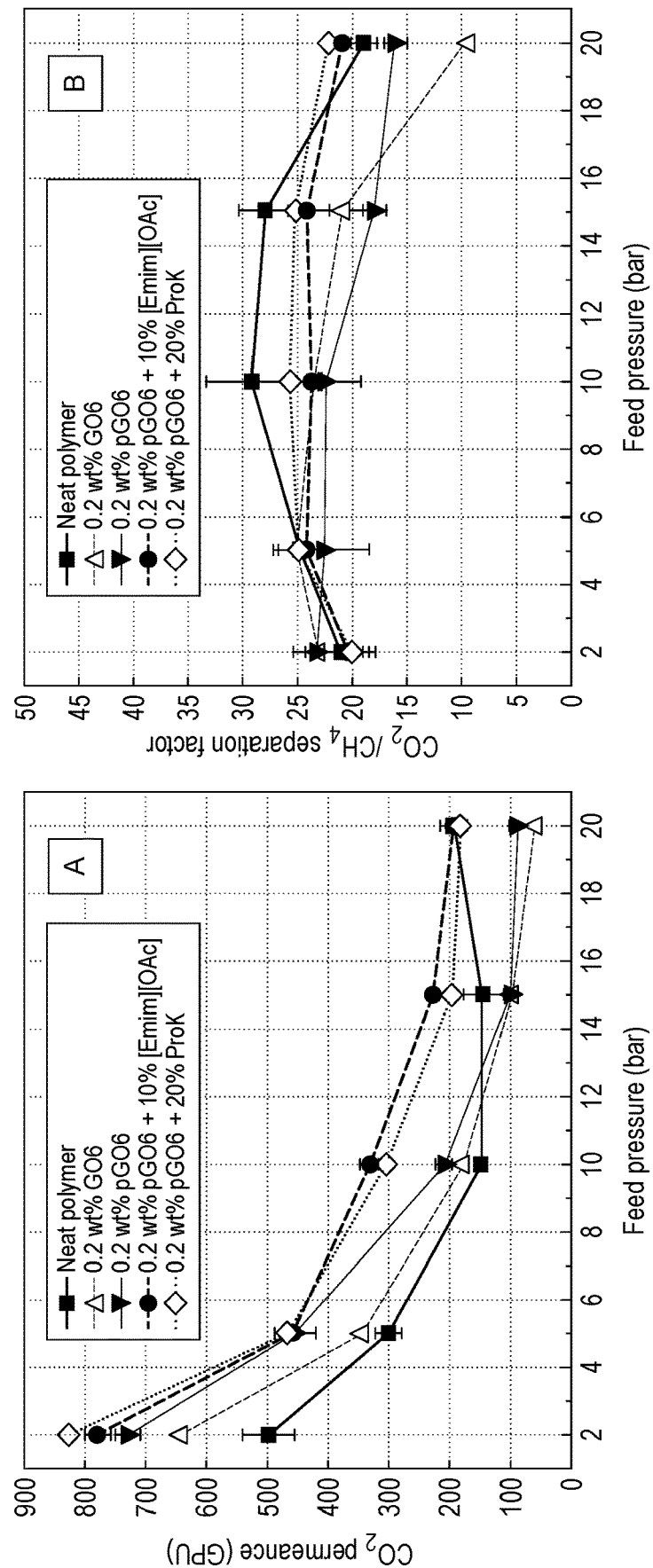
FIG. 10 shows $CO_2/CH_4$ mixed gas permeation performance of various 0.2 wt % membranes measured at 35° C. for hollow fiber composite membranes.

The effect of pressure on composite membrane performance was also investigated. The upstream pressure was increased from 2 bar to a maximum of 20 bar. Increasing feed pressure led to further distinguishable separation performance. Composite membranes of the invention are characterized with carrier saturation phenomenon at a high partial pressure of $CO_2$ in the feed. Since the availability of fixed $CO_2$ carriers (amine groups) in the polymer matrix is limited, increasing $CO_2$ partial pressure in the feed gas leads to carrier saturation, hence decreases the $CO_2$ permeance. Consequently, in all the systems discussed in this work, increasing pressure in the feed side reflects a drop in permeance of $CO_2$ as seen in FIG. 10.

Interestingly, the composite membrane with loading 2D fillers, both GO6 and pGO6, exhibited increased resistance to carrier saturation phenomenon especially in the pressures of 5 bar and 10 bar. Thus, the corresponding $CO_2$ permeances remained at 340 GPU and 450 GPU when compared with neat polymer at 300 GPU at 5 bar, which is typical operational pressure for biogas upgrading.

The composite membrane that contained mobile carriers showcased further resistance to carrier saturation phenomenon even further due to the increase of available $CO_2$ carriers as expected. The effect remains evident across the entire pressure range of testing for both 10 wt % [Emim][OAc] and 20 wt % Pro-K loaded membranes. These membranes showcased a $CO_2$ permeance of 463 GPU and 468 GPU and $CO_2/CH_4$ separation factors of 24 and 25, respectively, at 5 bar feed pressure.

Selected membranes were scaled up and tested on-site

Industrial Testing of Composite Membranes with Mobile Carriers

Hollow fiber composite membranes are prepared using the same PPO support as previously described. The selective layer was applied by dip coating. The coating solution concentration was about 0.15 wt % total solids and the amount of pGO was always maintained at an optimized concentration of 0.2 wt % with respect to the polymer content in the solution. The amount of mobile carriers was 10 wt % for [Emim}[OAc] and 20 wt % for ProK.

3 scaled up modules with membrane area ranging from 130 $cm^2$ to 200 $cm^2$ each were assembled and tested. The material configuration in the modules and the mechanical aspects are summarised in Table 1.

TABLE 1

Summary of second prototype modules with 3$^{rd}$ generation materials

| Module # | Polymer matrix | Nano-filler | Mobile carrier | No. of fibers | Length of fibers | Permeating area |
|---|---|---|---|---|---|---|
| 1 | SHBPAA/PVA | 0.2 wt % pGO | none | 70 | 20 | ~200 $cm^2$ |
| 2 | SHBPAA/PVA | 0.2 wt % pGO | 10% [Emim][OAc] | 55 | 15 | ~150 $cm^2$ |
| 3 | SHBPAA/PVA | 0.2 wt % pGO | 20% ProK | 55 | 20 | ~175 $cm^2$ |

The gas test was carried out using flue gas from the emission stack (height: 105 m.) placed close to the 5-stage cyclone pre-heater of the grey clinker production line at the Colacem Cement Plant located in Gubbio (PG) Italy.

The sampling point was located 30 meters below the top of the stack. A hole was made on the sidewall of the chimney and the vacuum pump was used to suck the flue gas from the chimney to the membrane module. A 2 μm ceramic filter, part of the gas sample probe (M&C Model SP180H), was used to remove the suspended particulate matter in the flue gas. The temperature of the flue gas from the stack, during the plant tests, was about 115° C. The composition of the dry flue gas, during the plant tests, is summarized in Table 2.

TABLE 2

Composition of the flue gas from the grey clinker production line

| | 2$^{nd}$ pre-pilot field test |
|---|---|
| Cement kiln | Production parameters |
| Raw Meal feeding (t/h) | ~192 t/h |
| Fuel feeding (t/h) | ~9 t/h |
| Clinker Production (t/h) | ~117 t/h |
| Stack emission components | Concentration in the dry flue gas |
| $CO_2$ (% v/v) | 10.5~12.0 |
| $O_2$ (% v/v) | 14.0~15.5 |
| $N_2$ (% v/v) | 73~76 |
| CO (ppmv) | 50~100 |
| NOx (ppmv) | 100~120 |
| SOx (ppmv) | 0~3 |
| $NH_3$ (ppmv) | 20~40 |
| HCl (ppmv) | 0.5~2 |
| Suspended P.M. ($mg/Nm^3$) | 1~3 (before removal) |

The flow chart of the in-field membrane permeation test is shown in FIG. 1. Except for the removal of suspended particulate matter from the flue gas by the filter, no further pretreatment was carried out for the feed gas. All the gas transport pipes were covered by electric heating tubing bundle to control the desired temperature for the test mainly to avoid humidity condensation. One needle valve was placed at the retentate side to control the feed pressure. The gas composition of the feed gas was measured by the Multicomponent Analysis System ACF-NT of ABB S.p.A., while that of the retentate and permeate streams was measured by the HORIBA PG 350 SRM and with TESTO Model 350XL-350S gas analyzers. The flow rates of the three streams were measured by TSI Model 4143 and confirmed by some floating element flow meters selected in accordance with the flow rate to be measured. If not specified, all the tests were carried out without vacuum or sweep gas. In the case that sweep gas was used, the composition of the IP grade gas was: 20.93% Oxygen and 79.07% Nitrogen.

Module 1: Effect of Vacuum and Stability Tests

Figure 11:
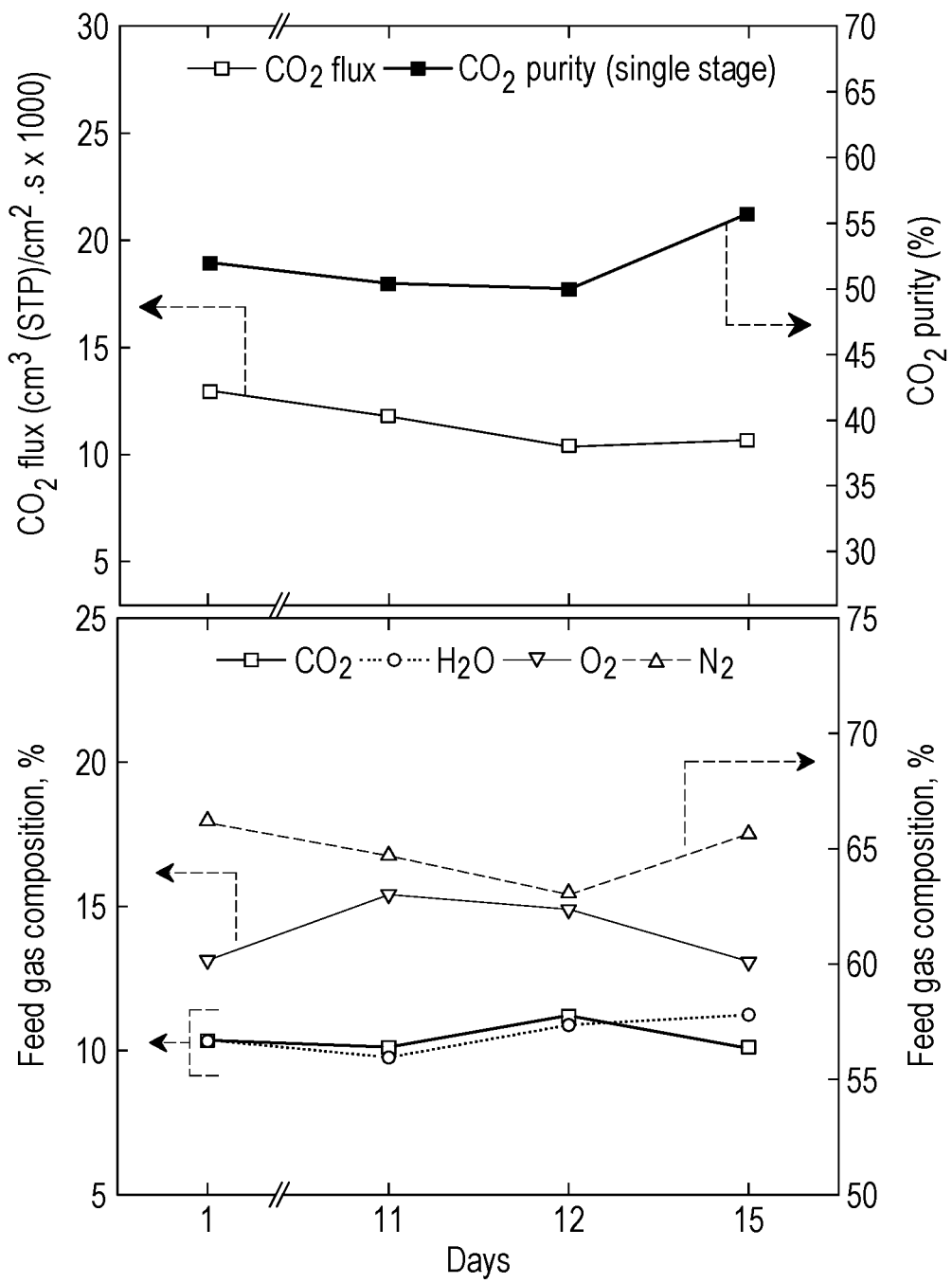
FIG. 11 shows module permeation performance of SHBPAA/PVA+0.2 wt % pGO membrane (tested at 60° C.; Permeate side: 0.3mbar vacuum; Feed: Stack gas @ 10 L min$^{-1}$ FIG. 12 shows module permeation performance of SHBPAA/PVA+0.2 wt % pGO membrane with and without mobile carriers (tested at 60° C.; Permeate side: 0.3 mbar vacuum; Feed: Stack gas @ 10 L min$^{-1}$).

Module 1 showcased a significant increase in $CO_2$ flux with the use of vacuum on the permeate side of the membrane. The recorded flux was double when compared to usage of sweep. The tests were also prolonged over a period of two weeks to simultaneous estimate the stability of the membrane at the maximum performance (FIG. 11). Given that there is no pretreatment of stack gas which still contains traces of $SO_x$ and NOx, the obtained long-term performances translate to significant material stability. Additionally, the drop in fluxes can be attributed to the water condensation in the pores and fluctuations in feed water content in real time.

Module 2 and 3: Effect of Water Content

Figure 12:
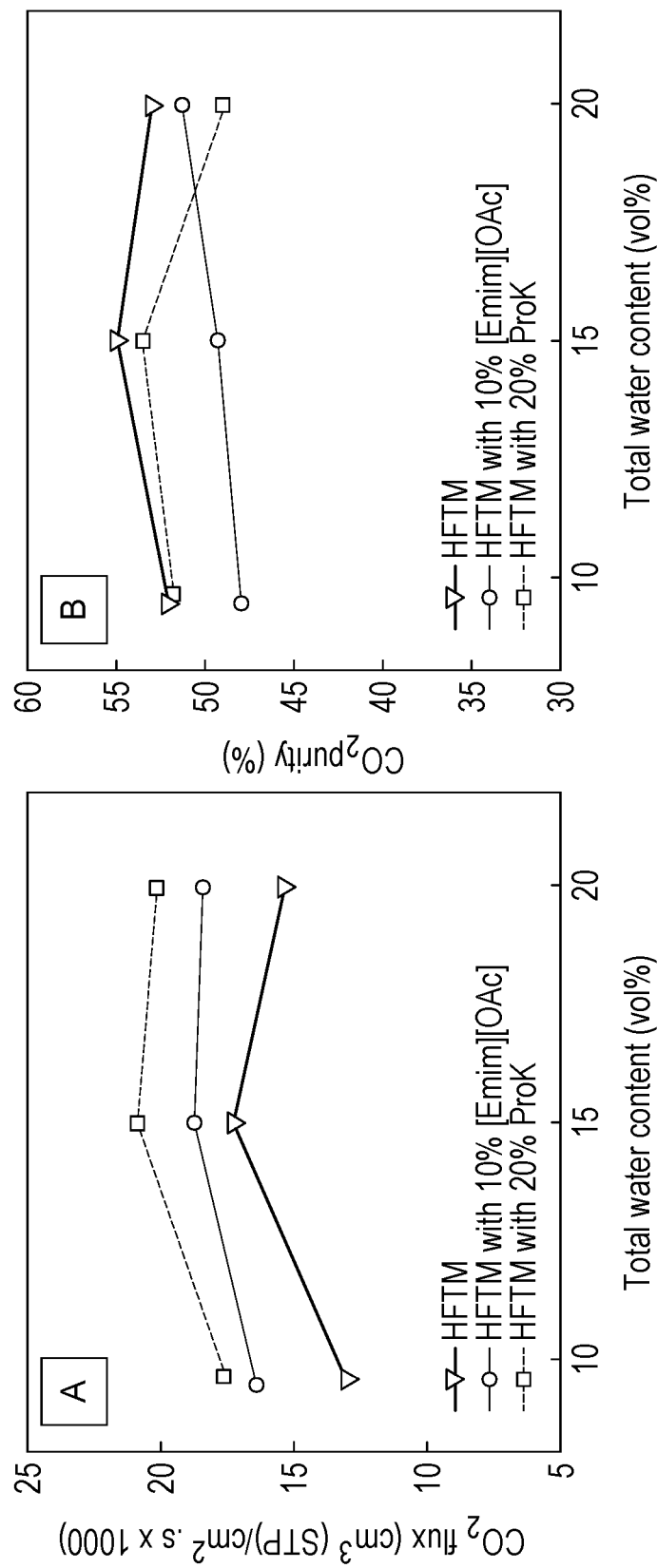

Water plays an important role in facilitated transport membranes. Since three modules 1, 2 and 3 have three different chemical configuration with respect to amine chemistry, the modules were subject to changing water content in the feed. An external evaporator system (HOVACAL) was used to force additional water into the feed stream. The results of permeation performance is shown in FIG. 12.

In general, all modules exhibited increasing flux and purity of $CO_2$ with increasing total water content in the feed gas. This proves that water as a carrier plays a major role in activation of the amine groups present in the backbone of the facilitated transport polymer chain. Additionally, high fluxes in both ProK and [Emim][OAc] containing modules were evident due to increase in total amount of $CO_2$-reactive groups present in the selective layer. [Emim][OAc] also acts as a physical solvent for $CO_2$ and hence the purity of the module containing [Emim][OAc] is lower than the other two modules due to physical sorption of both $CO_2$ and $N_2$ in the mobile phase.

Figure 13:
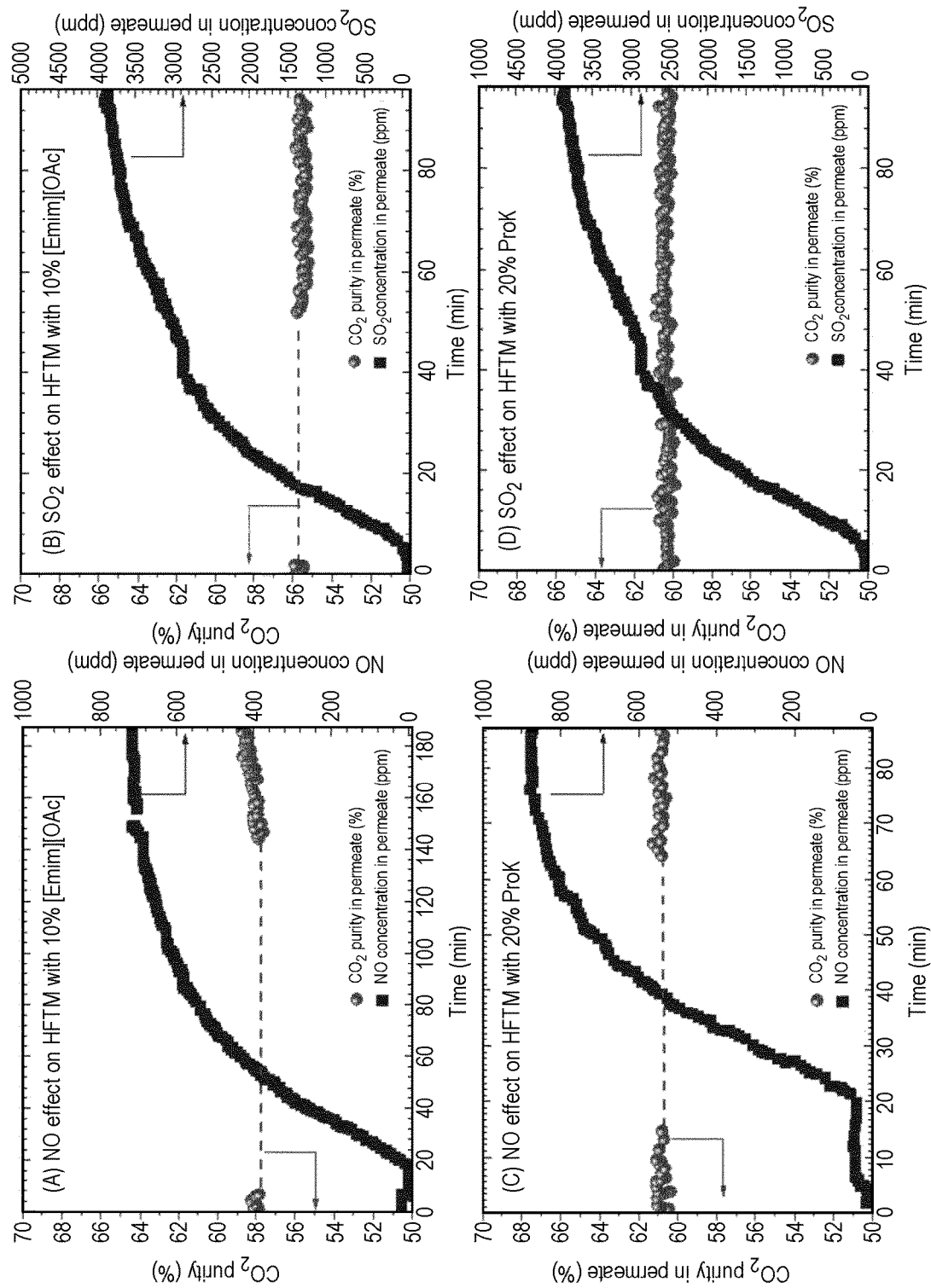
FIG. 13 shows the effect of SO$_x$ and NO$_x$ on composite membranes with mobile carriers—Effect of (A) NO and (B) $SO_2$ on $CO_2$ purity of Module 2; Effect of (C) NO and (D) $SO_2$ on $CO_2$ purity of Module 3.

Modules 2 and 3 were also tested for stability in the presence of $SO_x$ and $NO_x$. Composite membranes containing mobile carriers (ProK and [Emim][OAc]) were exposed to $SO_x$ and $NO_x$ in simulated flue gas and virtually no change in purity of CO2 in permeate was observed. Results are presented in FIG. 13.

Comparison to Existing Membranes Tested at Pilot Scale

Performance of membrane modules at larger scale when compared to the lab scale tests have been quantified in literature with flux and selectivity/purity of $CO_2$ in the permeate. However, there are challenges involved in estimation of fluxes in terms of GPU (1 GPU=$10^{-6}$ cm$^3$(STP) cm$^{-2}$ s$^{-1}$ cmHg$^{-1}$=$3.35\times10^{-10}$ mol m$^{-2}$ s$^{-2}$ Pa$^{-1}$). Permeance (flux) in GPU can be calculated only with assumptions on steady state driving force across the membrane. With these assumptions, the fabricated membranes have the following permeances in GPU are shown in Table 3.

These estimations are with the following assumptions—
- Partial pressure of $CO_2$ is negligible in permeate side due to smaller module size and use of continuous vacuum
- Flat $CO_2$ concentration profile in the feed side, this is justified by the low stage cut (<5%) and the shorter length of the module

TABLE 3

Estimation of $CO_2$ permeances in pre-pilot modules (variations with water content)

| Module | $CO_2$ Permeance (GPU) | $CO_2$ purity (single stage) | $CO_2$ flux (NL m$^{-2}$ h$^{-1}$) |
| --- | --- | --- | --- |
| Module 1: 0.2 wt % pGO | 860-1133 | 52-55 | 335.6-418.9 |
| Module 2: 0.2 wt % pGO with 10% [Emim][OAc] | 1093-1376 | 47-51 | 529.0-603.8 |
| Module 3: 0.2 wt % pGO with 20% ProK | 1130-1419 | 49-53 | 635.9-752.6 |

A surprising aspect of the present invention is therefore that the membranes comprising the mobile carriers have increased $CO_2$ permeance and increased $CO_2$ flux compared to the same modules without the mobile carriers, at industrially relevant conditions.

Benchmarking performances of the fabrication membranes with other membranes tested in industrial pilots can be done using the Table 5 obtained from Int. J. Greenhouse Gas Control, 86 (2019), pp. 191-200 as shown below. (Reference to each membrane can be found in the article).

TABLE 4

Summary of membrane pilot scale $CO_2$ capture test.

| Membrane materials | Membrane type | Feed Pressure | Temp (° C.) | $CO_2$ permeance (GPU) | $CO_2$ flux | $CO_2$ flux | Selectivity/ purity in permeate |
| --- | --- | --- | --- | --- | --- | --- | --- |
| PES | HF | 6~8 bar | — | 60 | — | — | 40 |
| Prism (polysulfone) | HF | 1.32 bar | RT | 400~500 | ~142 NLm$^{-2}$h$^{-1}$ | ~142 NLm$^{-2}$h$^{-1}$ | 3~6 |
| PVAm (FSC) | HF | 2.5 bar | 35 | 740 | ~500 NLm$^{-2}$h$^{-1}$ | ~500 NLm$^{-2}$h$^{-1}$ | 135 |
| PVAm (FSC) | HF | 1~6 bar | 23-45 | — | ~20 NLm$^{-2}$h$^{-1}$ | ~20 NLm$^{-2}$h$^{-1}$ | ~65% $CO_2$ in permeate side |
| Module 1 | HF | 1.7 | 60 | 860-1133 | 335.6-418.9 NLm$^{-2}$h$^{-1}$ | 385.4-468.09 NLm$^{-2}$h$^{-1}$ | 52-55 |
| Module 2 | HF | 1.7 | 60 | 1093-1376 | 529.0-603.8 NLm$^{-2}$h$^{-1}$ | 591.63 NLm$^{-2}$h$^{-1}$ | 47-51 |
| Module 3 | HF | 1.7 | 60 | 1130-1419 | 635.9-752.6 NLm$^{-2}$h$^{-1}$ | 635.94 NLm$^{-2}$h$^{-1}$ | 49-53 |

(HF = hollow fibre)

Conclusions

Composite membranes containing GO-based fillers in ultrathin selective layers were fabricated and tested. GO-based fillers were found to benefit composite membranes to increase the $CO_2$ separation properties depending on their lateral dimensions and loading. pGO fillers derived from size-optimized GO nanosheets at a loading of 0.2 wt % form continuous $CO_2$ permeation pathways along the $CO_2$-philic pGO surface with reoriented water channels surrounding 2D structure in the matrix. These composite membranes were characterized with a high $CO_2$ permeance of 780 GPU and a corresponding $CO_2/N_2$ separation factor of 30. Composite membranes with mobile carriers that reversibly react with $CO_2$ were also developed as hollow fibers.

It was found that the mobile carriers ProK and [Emim][OAc] were especially able to improve the separation performance of fixed site SHPAA/PVA membrane due to their high mobility and reversible interaction with $CO_2$ to form bicarbonate/carbonate species and carbene-$CO_2$ adducts respectively. As a new concept, composite membranes were combined with mobile carriers that resulted in membranes with $CO_2$ permeance of 825 GPU. These membranes were evaluated for both $CO_2/N_2$ and $CO_2/CH_4$ gas pairs and resulted in a separation factor of 31 for $CO_2/N_2$ and 20 for $CO_2/CH_4$. Due to the relative increase in the content of $CO_2$-philic species and reinforcement with addition of pGO, the composite membranes with mobile carriers were stable for feed pressures up to 20 bar and exhibited increased resistance to carrier saturation phenomena. This high stability and gas separation performance when combined with easily scalable hollow fiber configuration establishes the commercial viability of the fabricated membranes for $CO_2$ separation applications.

In particular, a surprising aspect of the present invention is that the membranes comprising the mobile carriers have increased $CO_2$ permeance and increased $CO_2$ flux compared to the same modules without the mobile carriers, at industrially relevant conditions.

The invention claimed is:

1. A composite membrane suitable for separating a gas from a gas mixture comprising a selective layer coated on a support, wherein said selective layer comprises:
   a) a polymeric matrix comprising an amine polymer;
   b) a graphene oxide nanofiller having an average lateral dimension of 1000 nm or less; and
   c) a mobile carrier selected from an ionic liquid or an amino acid salt;
   wherein the amount of graphene oxide nanofiller in the selective layer is 1 wt % or less.

2. The composite membrane as claimed in claim 1, wherein the polymeric matrix comprises a polymer comprising a repeating unit of formula (I)

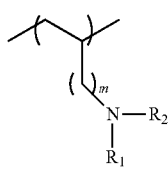

(I)

wherein $R_1$ and $R_2$ are independently selected from hydrogen or a $C_1$-$C_{10}$ hydrocarbyl group, and wherein the integer m is 0-6.

3. The composite membrane as claimed in claim 1, wherein the polymeric matrix comprises a polyallylamine having a repeating unit of formula (II):

(II)

wherein R is a $C_1$-$C_{10}$ hydrocarbyl group.

4. The composite membrane as claimed in claim 1, wherein the graphene oxide is physically or chemically modified.

5. The composite membrane as claimed in claim 1, wherein the graphene oxide is porous and/or comprises a polymer grafted thereto, optionally being an oxygen-and/or nitrogen-containing polymer.

6. The composite membrane as claimed in claim 1 wherein the support is a flat sheet or in the form of one or more hollow fibers.

7. The composite membrane as claimed claim 1, wherein the amount of mobile carrier in the membrane is in the range 1.0-40 wt %.

8. The composite membrane as claimed in claim 1, wherein the mobile carrier comprises an ionic liquid in which a cation is selected from 1-alkyl-3-methylimidazolium, 1-alkylpyridinium, fluorosulfonyl-trifluoromethane-sulfonylimide (FTFSI) N-methyl-N-alkylpyrrolidinium or comprises a salt of a naturally occurring amino acid.

9. The composite membrane as claimed in claim 1 wherein the selective layer has a thickness of 20 nm to 100 µm.

10. The composite membrane as claimed in claim 1 wherein the support is made of polyethersulfone (PES), polytetrafluoroethylene (PTFE), polypropylene, sulphonated polysulfone, polyvinylidene fluoride (PVDF), polyacrylonitrile (PAN) and related block copolymers, cellulosics, cellulose acetate (CA), polyimide, polyether imide (PEI), aliphatic polyamides, polyetheretherketone (PEEK), polyphenylene oxide (PPO) and polysulfone (PSf).

11. The composite membrane as claimed in claim 1, wherein the support is porous.

12. A process for the formation of a composite membrane as claimed in claim 1, comprising the steps of:
   (I) forming an aqueous solution comprising:
      a) a polymeric matrix comprising an amine polymer;
      b) a graphene oxide nanofiller, and
      c) a mobile carrier selected from an ionic liquid or an amino acid salt;
   (II) casting said aqueous solution onto a support.

13. The process as claimed in claim 12 wherein said support is a flat sheet support and the casting process uses a bar roller to apply the selective layer;
   or wherein the support is a hollow fiber and the casting process comprises a dip coating.

14. The process as claimed in claim 12 wherein the support is treated with a pore filling agent prior to casting the aqueous solution in step (II).

15. A process for separating a gas from a gas mixture, comprising a step of contacting the gas mixture with a membrane as claimed in claim 1.

16. The process of claim 15, wherein the process comprises separating carbon dioxide from a mixture containing the same.

17. A composite membrane suitable for separating a gas from a gas mixture comprising a selective layer coated on a hollow fiber or flat sheet support, wherein said selective layer comprises:

a) a polymeric matrix comprising an amine polymer;
b) a porous graphene oxide nanofiller or PEG-modified graphene oxide nanofiller, and optionally
c) a mobile carrier selected from an ionic liquid or an amino acid salt; wherein said porous graphene oxide nanofiller or PEG-modified graphene oxide nanofiller has an average lateral dimension of 1000 nm or less and is present in an amount of 1 wt % or less of the selective layer.

18. The composite membrane as claimed in claim 17 comprising a selective layer coated on a hollow fiber support, wherein said selective layer comprises:
a) a polymeric matrix comprising an amine polymer and a polyvinyl alcohol;
b) a porous graphene oxide nanofiller, and optionally
c) a mobile carrier selected from an ionic liquid or an amino acid salt; wherein said porous graphene oxide nanofiller has an average lateral dimension of 1000 nm or less and wherein it is present in an amount of 1 wt % or less of the selective layer.

19. A composite membrane suitable for separating a gas from a gas mixture comprising a selective layer coated on a support, wherein said selective layer comprises:
a) a polymeric matrix comprising an amine polymer;
b) a porous graphene oxide nanofiller or chemically-modified graphene oxide nanofiller, optionally wherein the chemically-modified graphene oxide nanofiller is graphene oxide with an organic unit grafted thereon, optionally wherein said organic unit is selected from a nitrogen and/or oxygen-containing organic unit, a polymer, or a nitrogen-and/or oxygen-containing polymer, and optionally
c) a mobile carrier selected from an ionic liquid or an amino acid salt; wherein said porous graphene oxide nanofiller or chemically-modified graphene oxide nanofiller has an average lateral dimension of 1000 nm or less and is present in an amount of 1 wt % or less of the selective layer.

20. The composite membrane as claimed in claim 1, wherein the graphene oxide nanofiller is present in the selective layer in an amount of less than 1 wt %.

* * * * *